United States Patent
Park et al.

(10) Patent No.: US 11,419,134 B2
(45) Date of Patent: Aug. 16, 2022

(54) METHOD FOR TRANSMITTING AND RECEIVING UPLINK SIGNAL IN WIRELESS COMMUNICATION SYSTEM SUPPORTING NON-LICENSED BAND, AND APPARATUS FOR SUPPORTING SAME

(71) Applicant: LG Electronics Inc., Seoul (KR)

(72) Inventors: Hanjun Park, Seoul (KR); Seonwook Kim, Seoul (KR); Joonkui Ahn, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 502 days.

(21) Appl. No.: 16/088,253

(22) PCT Filed: Mar. 23, 2017

(86) PCT No.: PCT/KR2017/003122
§ 371 (c)(1),
(2) Date: Sep. 25, 2018

(87) PCT Pub. No.: WO2017/164664
PCT Pub. Date: Sep. 28, 2017

(65) Prior Publication Data
US 2020/0413426 A1    Dec. 31, 2020

Related U.S. Application Data

(60) Provisional application No. 62/347,574, filed on Jun. 8, 2016, provisional application No. 62/334,441, filed (Continued)

(51) Int. Cl.
*H04W 72/12* (2009.01)
*H04L 5/00* (2006.01)
*H04W 16/14* (2009.01)

(52) U.S. Cl.
CPC ......... *H04W 72/1268* (2013.01); *H04L 5/001* (2013.01); *H04L 5/0037* (2013.01);
(Continued)

(58) Field of Classification Search
CPC ............. H04W 72/1268; H04W 16/14; H04W 72/1289; H04W 72/1294; H04W 4/70;
(Continued)

(56) References Cited

U.S. PATENT DOCUMENTS

| | | | |
|---|---|---|---|
| 2005/0249181 A1 | 11/2005 | Vijayan et al. | |
| 2009/0316814 A1* | 12/2009 | Seo | H04W 72/0446 375/260 |
| 2011/0134856 A1* | 6/2011 | Seo | H04L 1/0071 370/329 |
| 2011/0134857 A1* | 6/2011 | Seo | H04L 5/0039 370/329 |

(Continued)

OTHER PUBLICATIONS

International Search Report in International Application No. PCT/KR2017/003122, dated Jul. 25, 2017, 19 pages (with English Translation).

*Primary Examiner* — Ayaz R Sheikh
*Assistant Examiner* — Louis Samara
(74) *Attorney, Agent, or Firm* — Fish & Richardson P.C.

(57) ABSTRACT

A method for transmitting and receiving an uplink signal between a terminal and a base station in a wireless communication system which supports a non-licensed band, and an apparatus for supporting the same are disclosed. Specifically, a specific method in which a base station allocates transmission resources in a non-licensed band to a terminal and the terminal transmits an uplink signal using the allocated transmission resources, and an apparatus for supporting the same are disclosed.

12 Claims, 21 Drawing Sheets

Related U.S. Application Data on May 10, 2016, provisional application No. 62/319,302, filed on Apr. 7, 2016, provisional application No. 62/316,529, filed on Mar. 31, 2016, provisional application No. 62/313,146, filed on Mar. 25, 2016.

(52) U.S. Cl.
CPC ............ *H04L 5/0094* (2013.01); *H04W 16/14* (2013.01); *H04W 72/1289* (2013.01); *H04J 2211/008* (2013.01)

(58) Field of Classification Search
CPC ............ H04W 52/143; H04W 74/0833; H04W 72/0446; H04L 5/001; H04L 5/0037; H04L 5/0041; H04L 1/0071; H04L 5/0057; H04L 5/0007; H04L 5/0051; H04L 5/0053; H04J 2211/008
See application file for complete search history.

(56) References Cited

U.S. PATENT DOCUMENTS

| | | | |
|---|---|---|---|
| 2013/0072242 A1* | 3/2013 | Iwai | H04W 72/0406 455/509 |
| 2015/0085797 A1 | 3/2015 | Ji et al. | |
| 2015/0156638 A1* | 6/2015 | Yerramalli | H04L 5/0051 455/454 |
| 2015/0181589 A1* | 6/2015 | Luo | H04L 5/0032 370/329 |
| 2016/0037352 A1 | 2/2016 | Wei et al. | |
| 2017/0070994 A1* | 3/2017 | Rico Alvarino | H04L 5/0048 |
| 2017/0273056 A1* | 9/2017 | Papasakellariou | H04W 52/44 |
| 2018/0070339 A1* | 3/2018 | Horiuchi | H04L 5/0048 |
| 2019/0238291 A1* | 8/2019 | Iwai | H04L 5/0057 |
| 2020/0028740 A1* | 1/2020 | Kim | H04L 41/0803 |

\* cited by examiner (a)

(b)

METHOD FOR TRANSMITTING AND RECEIVING UPLINK SIGNAL IN WIRELESS COMMUNICATION SYSTEM SUPPORTING NON-LICENSED BAND, AND APPARATUS FOR SUPPORTING SAME

CROSS-REFERENCE TO RELATED APPLICATIONS

This application is a National Stage application under 35 U.S.C. § 371 of International Application No. PCT/KR2017/003122, filed on Mar. 23, 2017, which claims the benefit of U.S. Provisional Application No. 62/347,574, filed on Jun. 8, 2016, U.S. Provisional Application No. 62/334,441, filed on May 10, 2016, U.S. Provisional Application No. 62/319,302, filed on Apr. 7, 2016, U.S. Provisional Application No. 62/316,529, filed on Mar. 31, 2016, and U.S. Provisional Application No. 62/313,146, filed on Mar. 25, 2016. The disclosures of the prior applications are incorporated by reference in their entirety.

TECHNICAL FIELD

Following description relates to a wireless communication system supporting an unlicensed band, and more particularly, to a method of transmitting and receiving an uplink signal between a user equipment and a base station in a wireless communication system supporting an unlicensed band and apparatuses supporting the method.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Task

An object of the present invention is to provide a method for a base station to allocate an uplink resource for transmitting an uplink signal on an unlicensed band and a method for a user equipment and a base station to transmit and receive an uplink signal based on the allocated uplink resource In particular, an object of the present invention is to specify a method of allocating an uplink resource satisfying a restriction or a regulation on an unlicensed band of some nations and provide a method of transmitting and receiving an uplink signal between a base station and a user equipment based on the uplink resource allocation method.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention proposes a method of transmitting and receiving an uplink signal between a user equipment and a base station in a wireless communication system supporting an unlicensed band and apparatuses supporting the method.

To achieve these and other advantages and in accordance with the purpose of the present invention, as embodied and broadly described, according to one embodiment, a method of receiving an uplink signal, which is received by a base station from a user equipment in a wireless communication system supporting an unlicensed band, the method comprises transmitting control information for allocating an uplink resource to the user equipment, and receiving the uplink signal from the user equipment through an uplink resource indicated by the control information. In this case, the control information indicates one of a plurality of states indicating one or more interlaces among a plurality of interlaces included in an entire system band and the plurality of the states includes first states indicating one or more contiguous interlaces and second states indicating one or more non-contiguous interlaces.

To further achieve these and other advantages and in accordance with the purpose of the present invention, according to a different embodiment, a method of transmitting an uplink signal, which is transmitted by a user equipment to a base station in a wireless communication system supporting an unlicensed band, the method comprises receiving control information for allocating an uplink resource from the base station, and transmitting the uplink signal through an uplink resource indicated by the control information. In this case, the control information indicates one of a plurality of states indicating one or more interlaces among a plurality of interlaces included in the entire system band and the plurality of the states include first states indicating one or more contiguous interlaces and second states indicating one or more non-contiguous interlaces.

To further achieve these and other advantages and in accordance with the purpose of the present invention, according to a further different embodiment, base station receiving an uplink signal from a user equipment in a wireless communication system supporting an unlicensed band, the base station comprises a receiver, a transmitter, and a processor configured to operate in a manner of being connected with the receiver and the transmitter, the processor configured to transmit control information for allocating an uplink resource to the user equipment, the processor configured to receive the uplink signal from the user equipment through an uplink resource indicated by the control information. In this case, the control information indicates one of a plurality of states indicating one or more interlaces among a plurality of interlaces included in the entire system band and the plurality of the states include first states indicating one or more contiguous interlaces and second states indicating one or more non-contiguous interlaces.

To further achieve these and other advantages and in accordance with the purpose of the present invention, according to a further different embodiment, a user equipment transmitting an uplink signal to a base station in a wireless communication system supporting an unlicensed band, the user equipment comprises a receiver, a transmitter, and a processor configured to operation in a manner of being connected with the receiver and the transmitter, the processor configured to receive control information for allocating an uplink resource from the base station, the processor configured to transmit the uplink signal via an uplink resource indicated by the control information. In this case, the control information indicates one of a plurality of states indicating one or more interlaces among a plurality of interlaces included in the entire system band and the plurality of the states include first states indicating one or more contiguous interlaces and second states indicating one or more non-contiguous interlaces.

In this case, one interlace can include resource blocks (RBs) separated from each other with a prescribed frequency interval. In this case, the prescribed frequency interval may correspond to 10 RBs.

For example, if 10 interlaces included in the entire system band are indexed by interlaces 0 to 9 in a frequency domain order, the second states can include a state indicating interlaces having (1, 2, 3, 4, 5, 6, 7, 8, 9) indexes among the 10 interlaces.

As a different example, if 10 interlaces included in the entire system band are indexed by interlaces 0 to 9 in a frequency domain order, the second states can include a state indicating interlaces having (2, 3, 4, 7, 8, 9) indexes among the 10 interlaces.

In this case, the control information can include an RIV (Resource Indication Value).

And, the entire system band may correspond to 100 resource blocks (RBs).

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

As is apparent from the above description, the embodiments of the present disclosure have the following effects.

According to the present invention, a base station can allocate various uplink resources to a user equipment. In particular, the base station can allocate an uplink resource satisfying a restriction or a regulation in some nations. And, it is able to transmit and receive an uplink signal between a base station and a user equipment using the allocated uplink resource.

Effects obtainable from the present invention are non-limited by the above mentioned effect. And, other unmentioned effects can be clearly understood from the following description by those having ordinary skill in the technical field to which the present invention pertains. That is, effects which are not intended by the present invention may be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE

Mode for Invention

Figure 1:
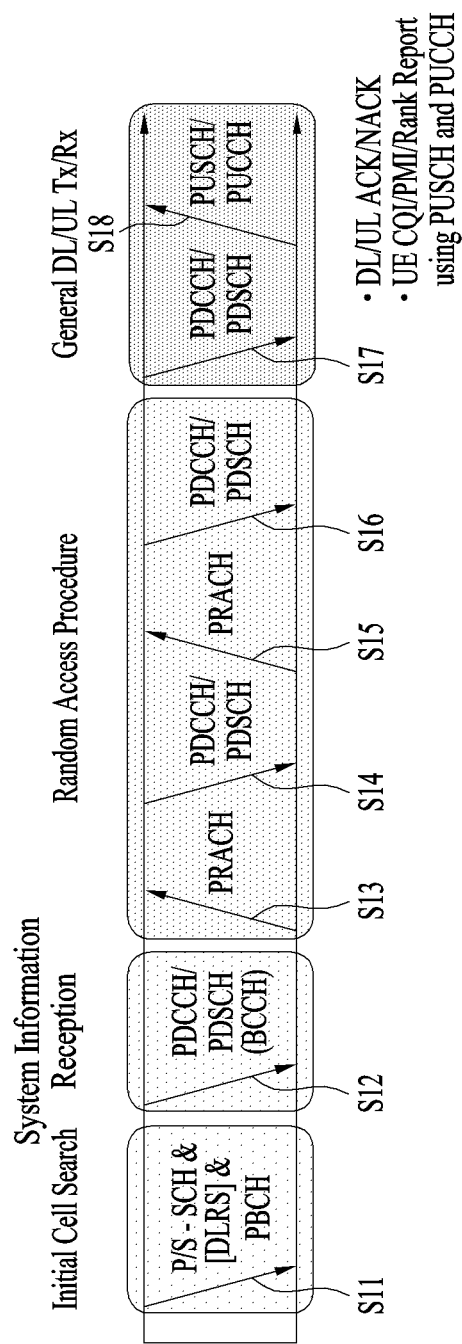
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), and CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
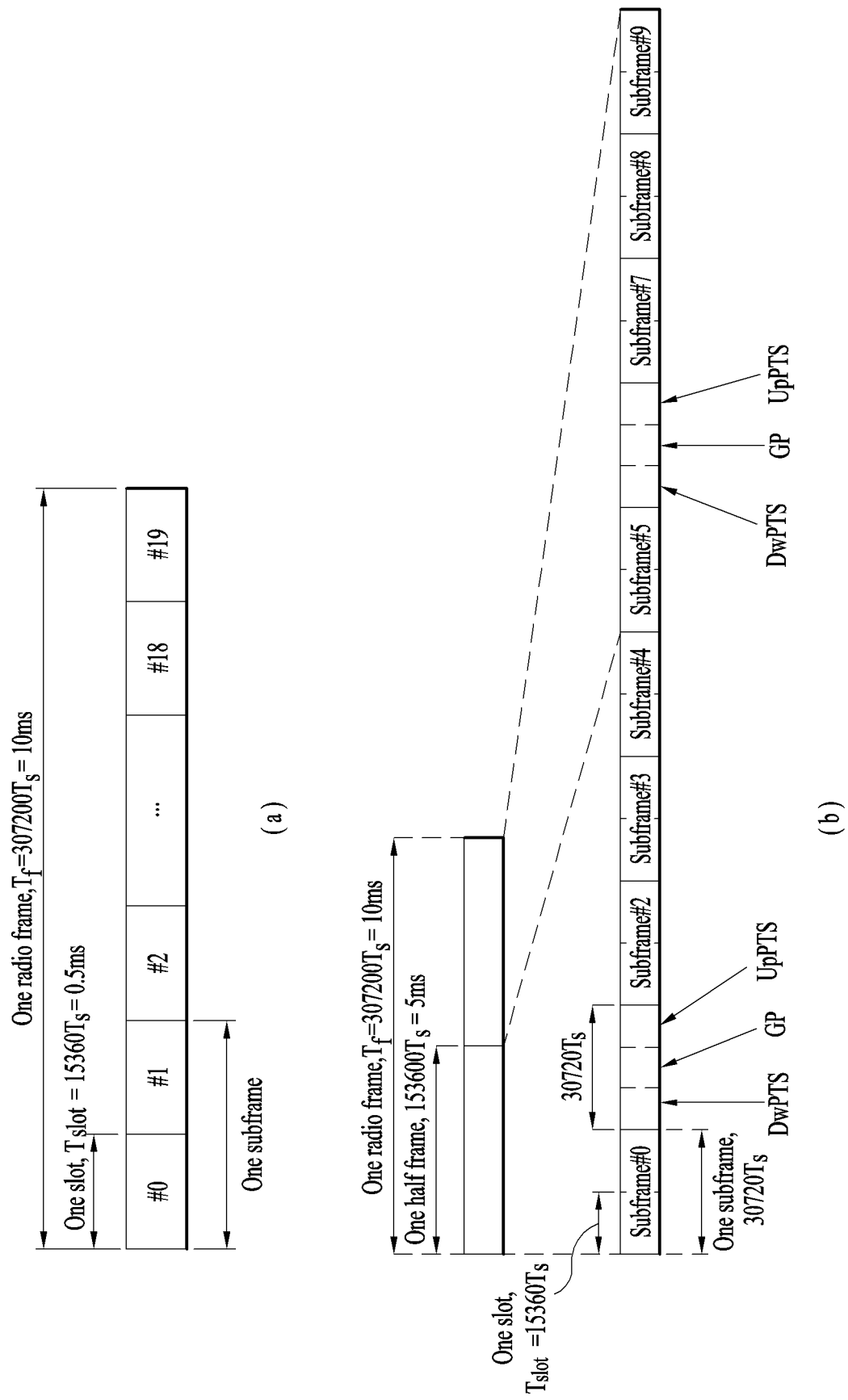
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f = 307200 \cdot T_s$) long, including equal-sized 20 slots indexed from 0 to 19. Each slot is 0.5 ms ($T_{slot} = 15360 \cdot T_s$) long. One subframe includes two successive slots. An ith subframe includes 2ith and (2i+1)th slots. That is, a radio frame includes 10 subframes. A time required for transmitting one subframe is defined as a Transmission Time Interval (TTI). $T_s$ is a sampling time given as $T_s = 1/(15 \text{ kHz} \times 2048) = 3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f = 307200 \cdot T_s$) long, including two half-frames each having a length of 5 ms ($=153600 \cdot T_s$) long. Each half-frame includes five subframes each being 1 ms ($=30720 \cdot T_s$) long. An ith subframe includes 2ith and (2i+1)th slots each having a length of 0.5 ms ($T_{slot} = 15360 \cdot T_s$). $T_s$ is a sampling time given as $T_s = 1/(15 \text{ kHz} \times 2048) = 3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |

TABLE 1-continued

| | Normal cyclic prefix in downlink | | | Extended cyclic prefix in downlink | | |
| --- | --- | --- | --- | --- | --- | --- |
| Special | | UpPTS | | | UpPTS | |
| subframe configuration | DwPTS | Normal cyclic prefix in uplink | Extended cyclic prefix in uplink | DwPTS | Normal cyclic prefix in uplink | Extended cyclic prefix in uplink |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 3:
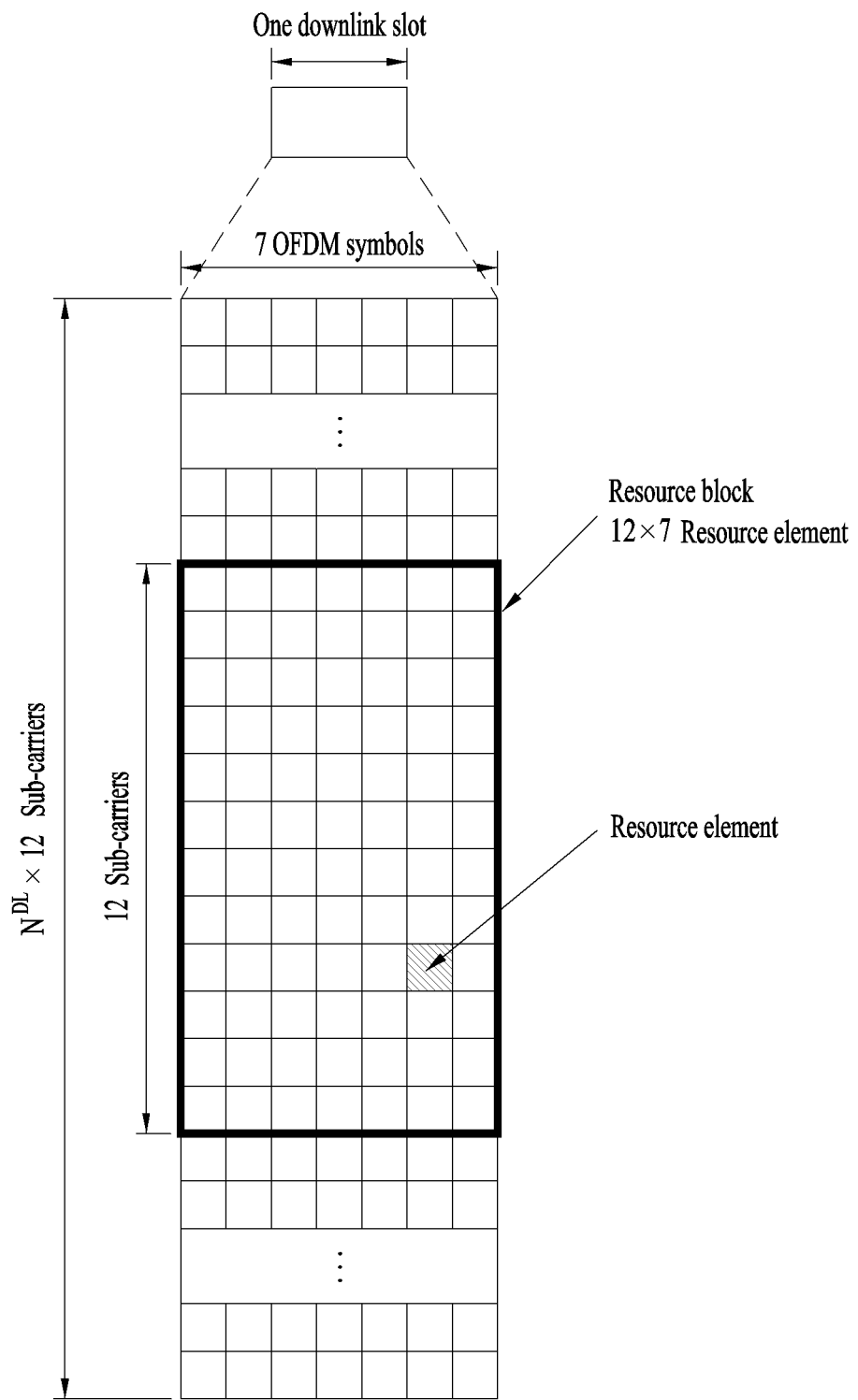
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A structure of an uplink slot may be identical to a structure of a downlink slot.

Figure 4:
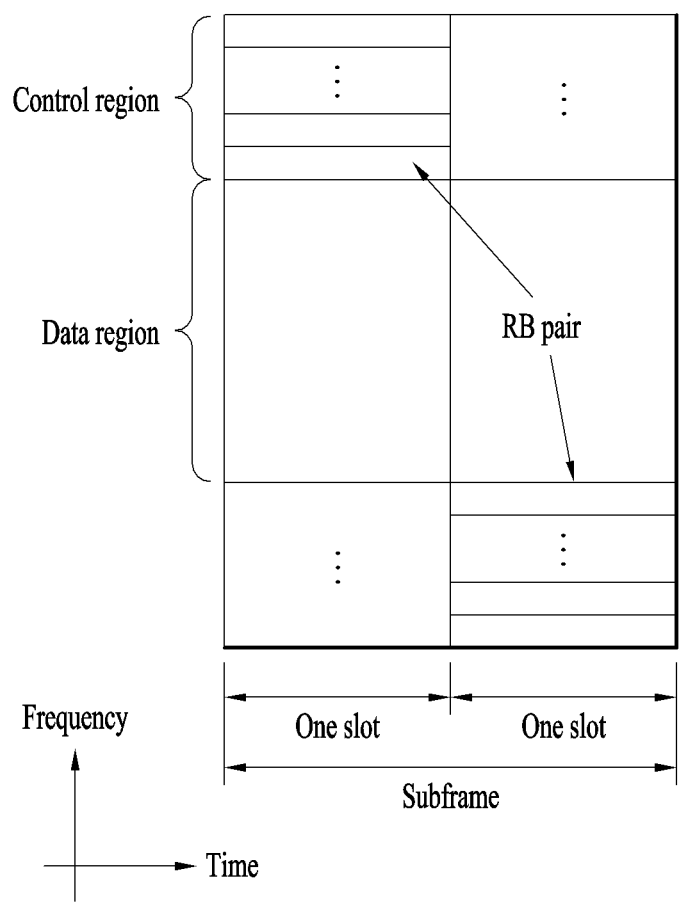
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe is allocated to a PUCCH for a UE. The RBs of the RB pair occupy different subcarriers in two slots. Thus it is said that the RB pair frequency-hops over a slot boundary.

Figure 5:
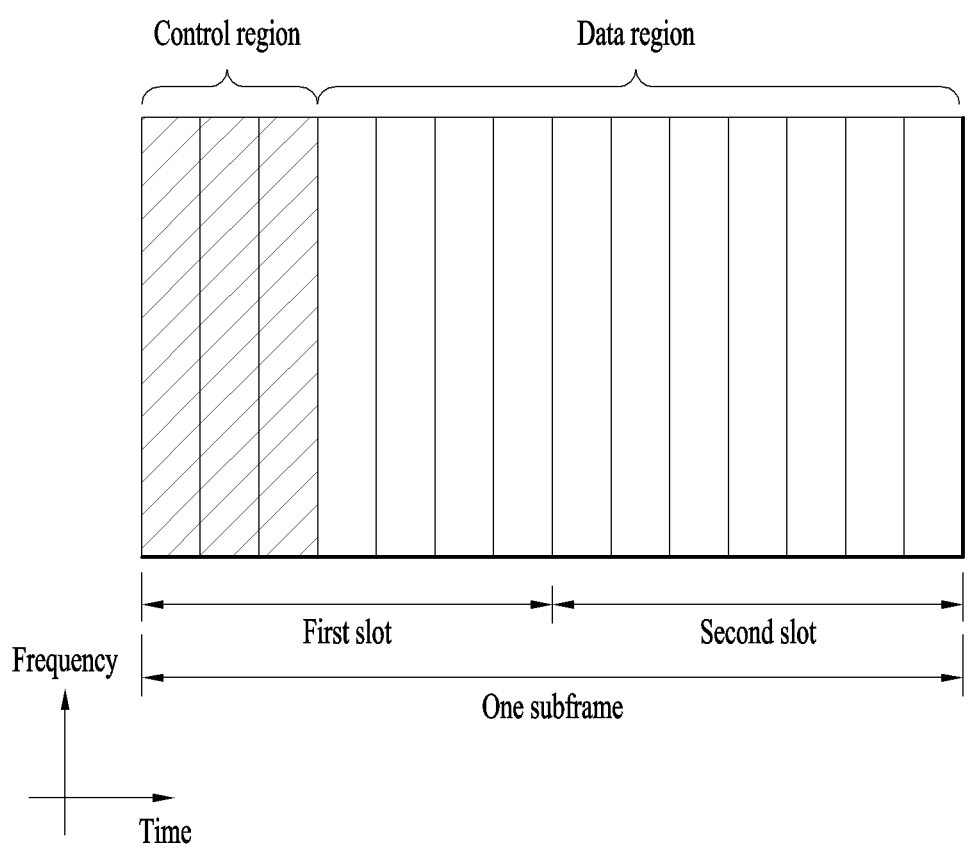
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. LTE-U System 2.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating on an unlicensed band is referred to as LAA (Licensed Assisted Access) and the LAA may correspond to a scheme of performing data transmission/reception in an unlicensed band using a combination with a licensed band.

Figure 6:
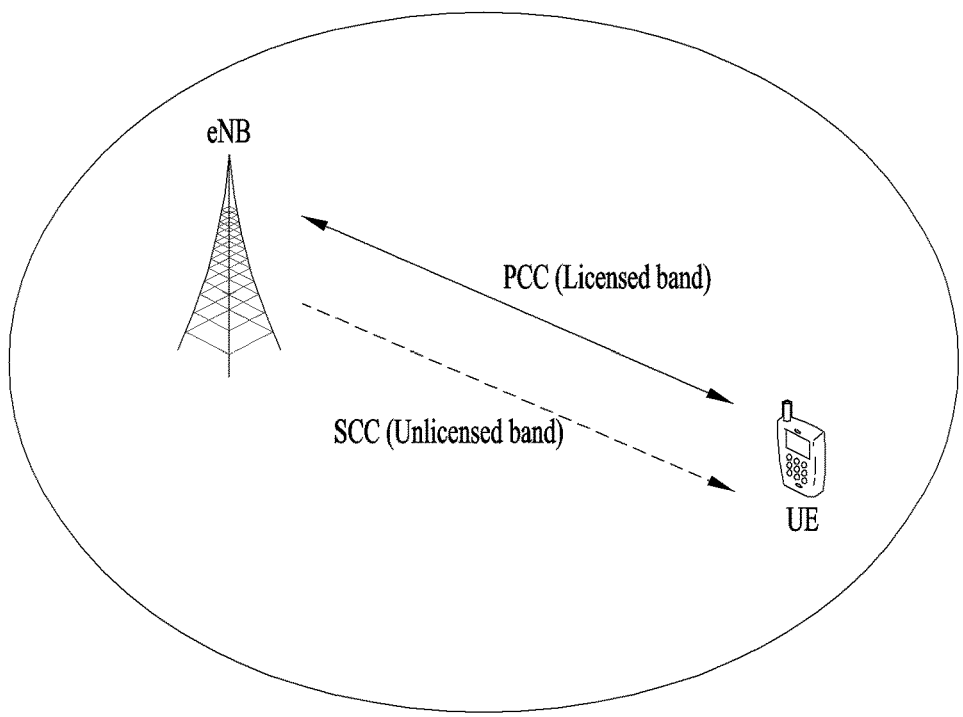
FIG. 6 is a diagram illustrating an exemplary CA environment supported in an LTE-Unlicensed (LTE-U) system.

FIG. 6 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 6, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 6 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 7:
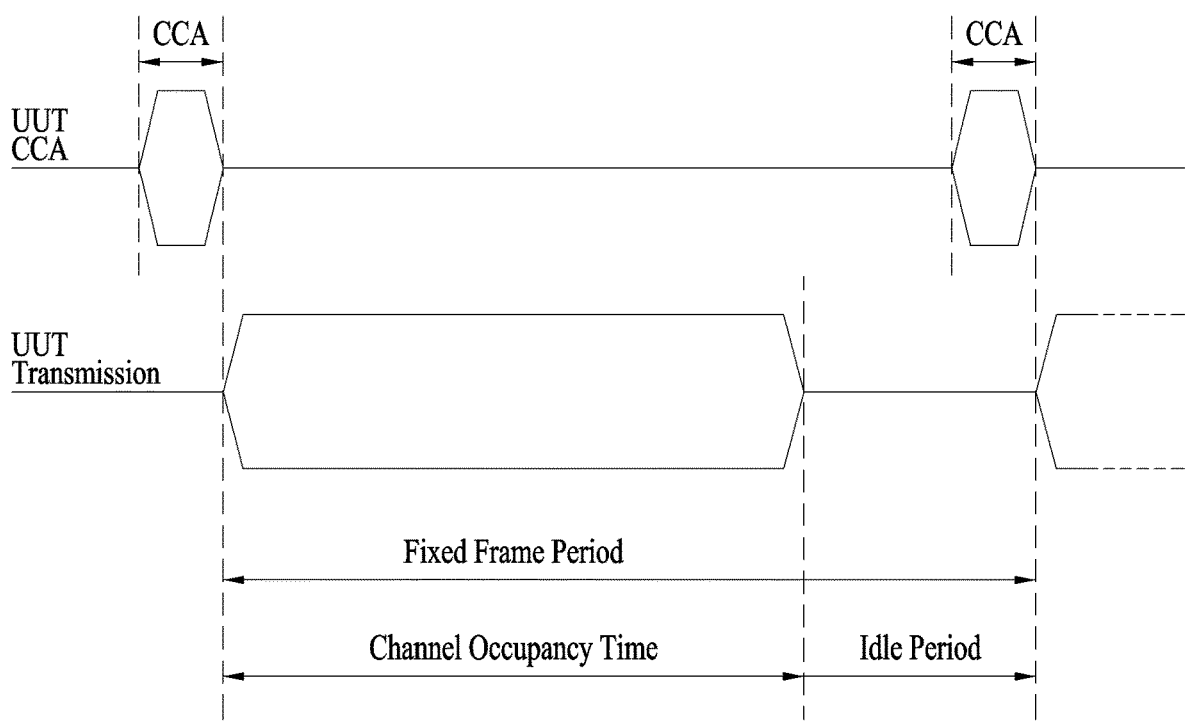
FIG. 7 is a diagram illustrating an exemplary Frame Based Equipment (FBE) operation as one of Listen-Before-Talk (LBT) operations.

FIG. 7 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 8:
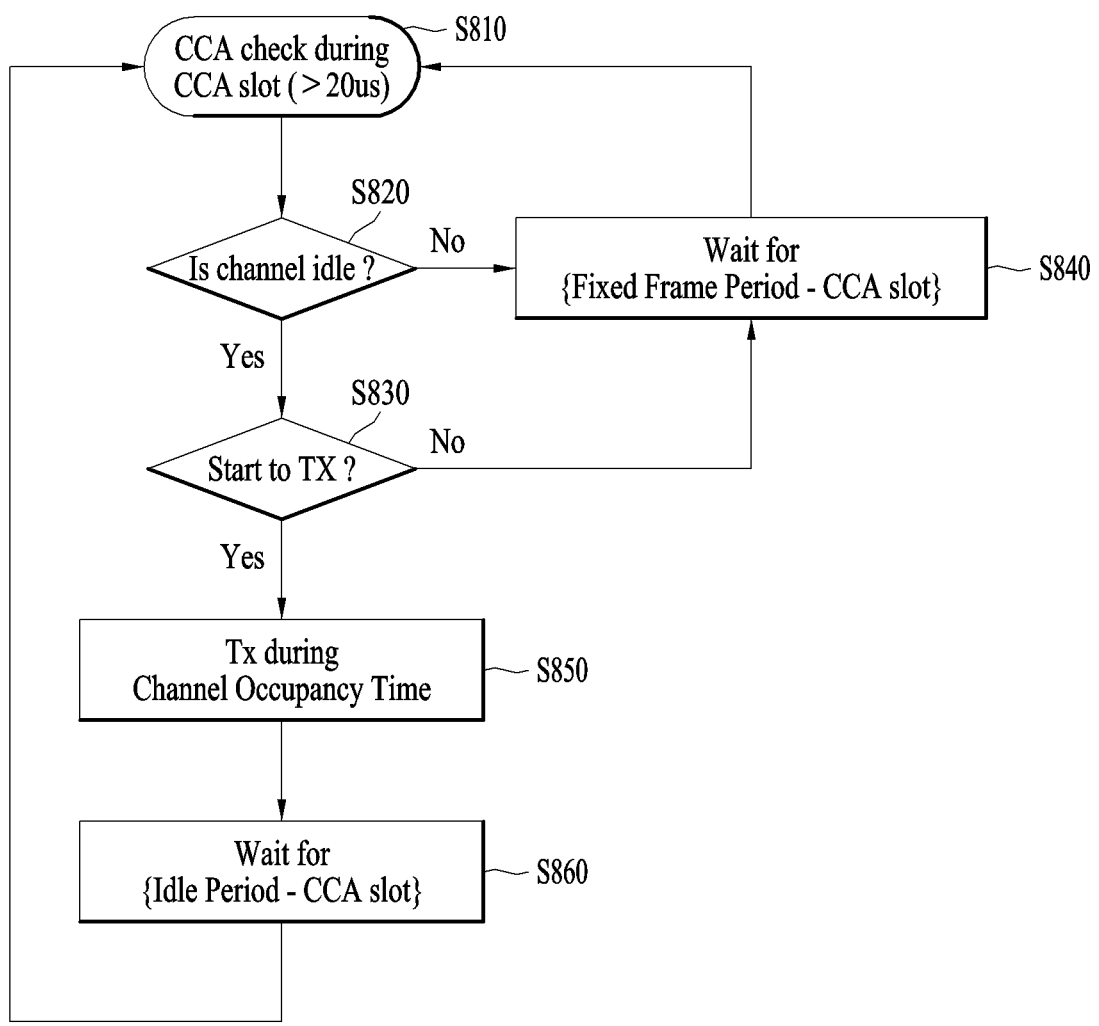
FIG. 8 is a block diagram illustrating the FBE operation.

FIG. 8 is a block diagram illustrating the FBE operation.

Referring to FIG. 8, a communication node (i.e., eNB) managing an SCell performs CCA during a CCA slot [S810]. If the channel is idle [S820], the communication node performs data transmission (Tx) [S830]. If the channel is busy, the communication node waits for a time period calculated by subtracting the CCA slot from a fixed frame period, and then resumes CCA [S840].

The communication node transmits data during the channel occupancy time [S850]. Upon completion of the data transmission, the communication node waits for a time period calculated by subtracting the CCA slot from the idle period [S860], and then resumes CCA [S810]. If the channel is idle but the communication node has no transmission data, the communication node waits for the time period calculated by subtracting the CCA slot from the fixed frame period [S840], and then resumes CCA [S810].

Figure 9:
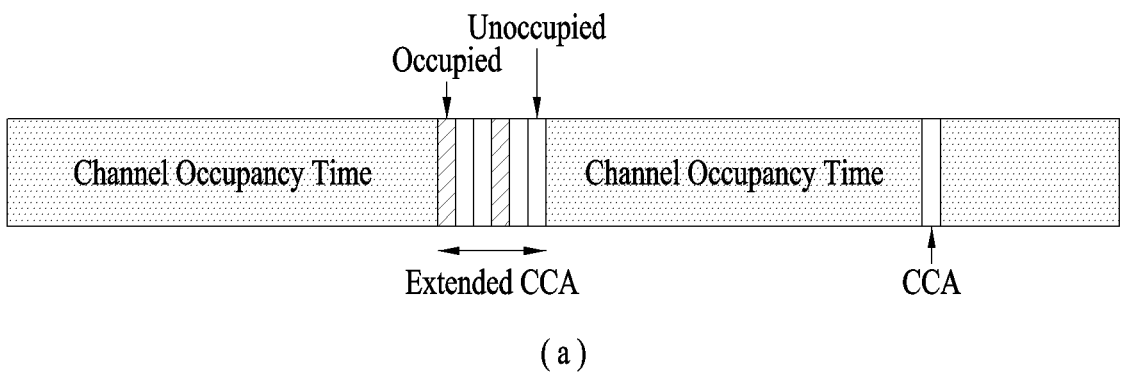
FIG. 9 is a diagram illustrating an exemplary Load Based Equipment (LBE) operation as one of the LBT operations.
Figure 9:
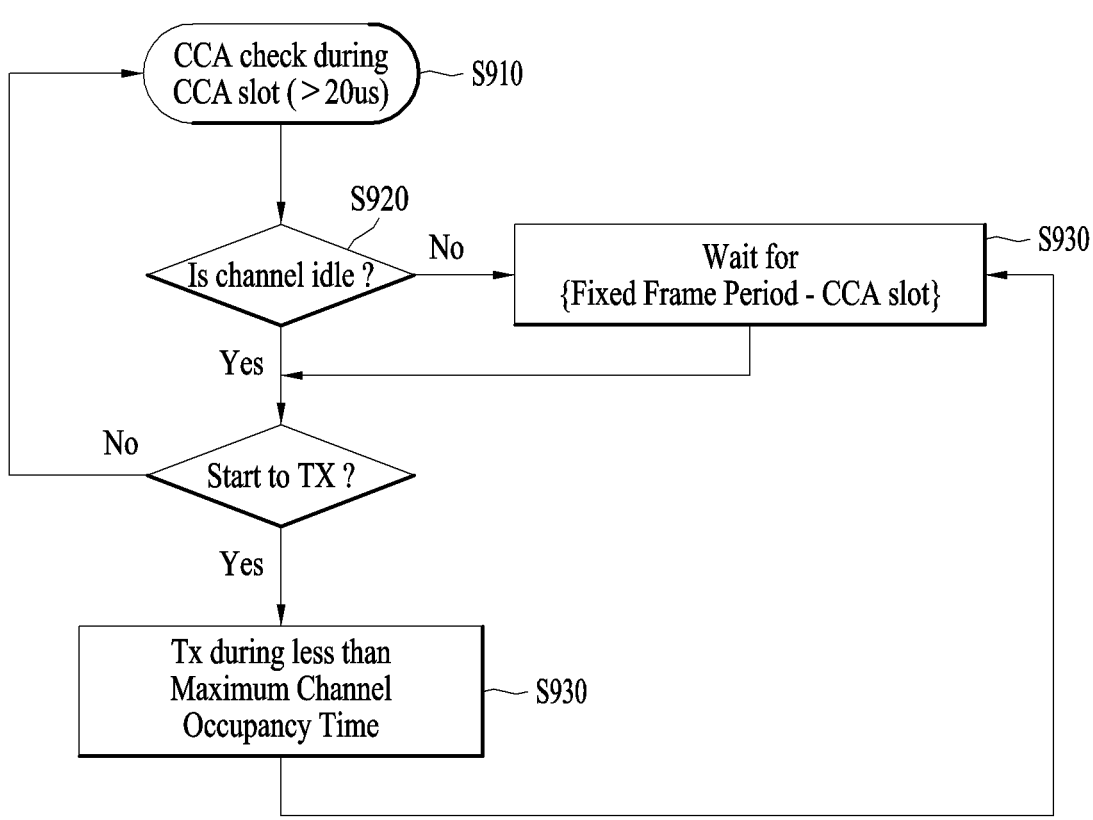

FIG. 9 is a view illustrating an exemplary LBE operation as one of the LBT operations.

Referring to FIG. 9(a), in LBE, the communication node first sets q (q ∈{4, 5, . . . , 32}) and then performs CCA during one CCA slot.

FIG. 9(b) is a block diagram illustrating the LBE operation. The LBE operation will be described with reference to FIG. 9(b).

The communication node may perform CCA during a CCA slot [S910]. If the channel is unoccupied in a first CCA slot [S920], the communication node may transmit data by securing a time period of up to (13/32)q ms [S930].

On the contrary, if the channel is occupied in the first CCA slot, the communication node selects N (N ∈ {1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms [S940].

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 10:
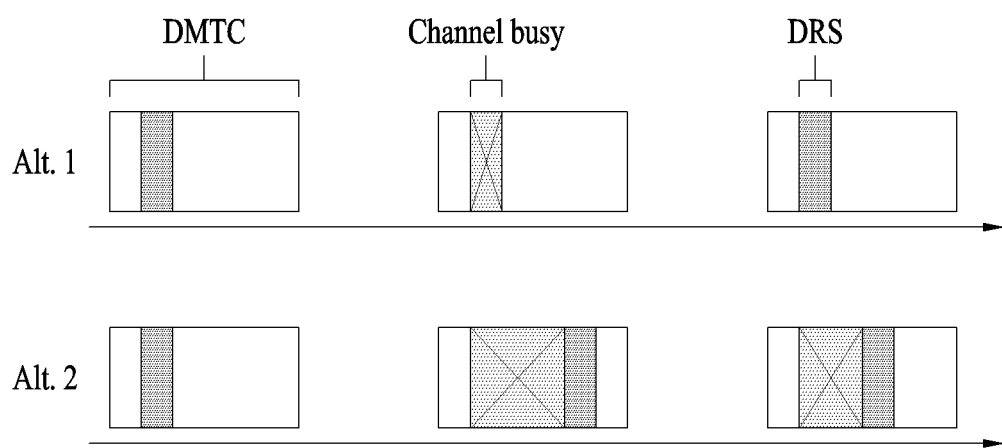
FIG. 10 is a diagram for explaining methods of transmitting a DRS supported in an LAA system.

FIG. 10 is a diagram for explaining DRS transmission methods supported by LAA system.

Referring to FIG. 10, the upper part of FIG. 10 shows the aforementioned first scheme for transmitting a DRS and the bottom part of FIG. 10 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 11:
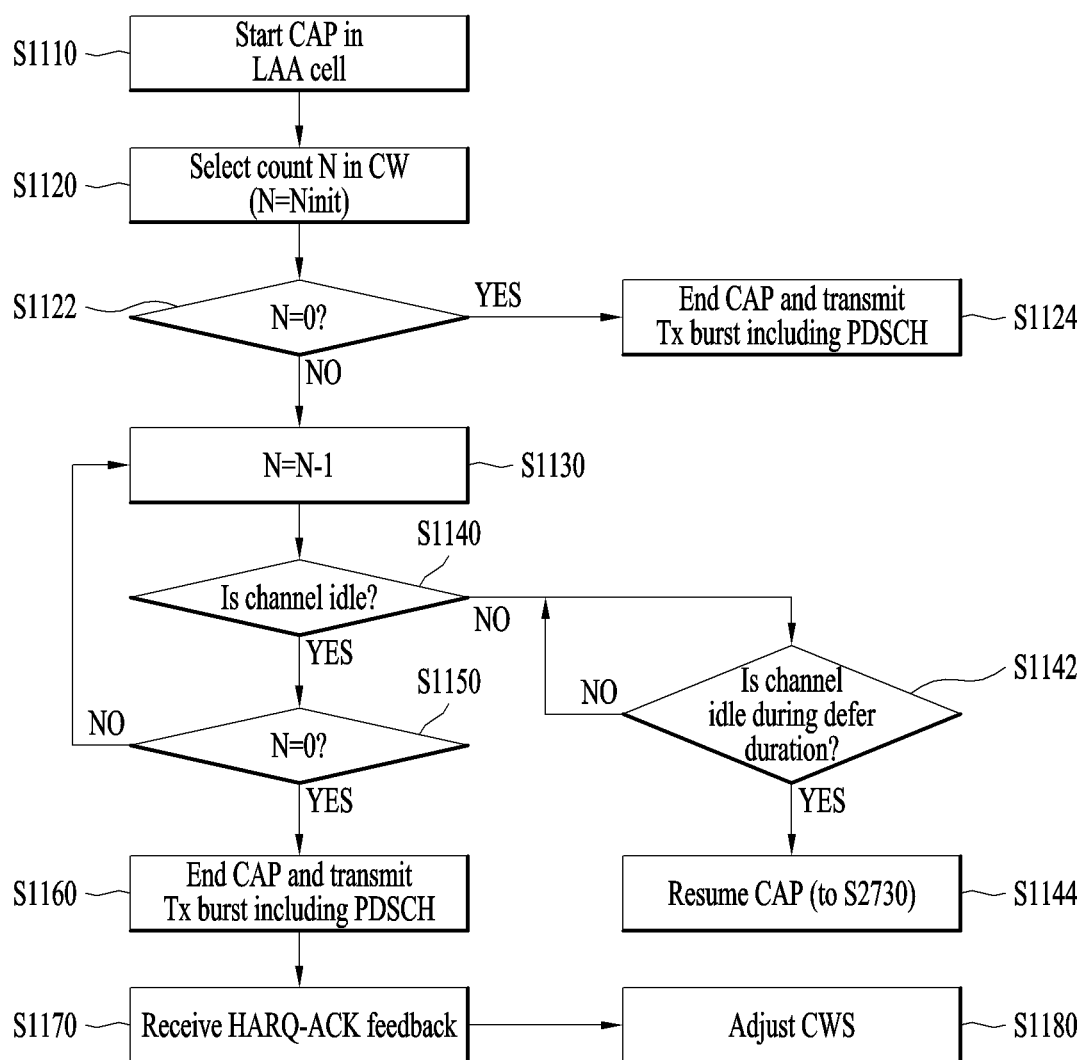
FIG. 11 is a flowchart for explaining CAP and CWA.

FIG. 11 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1110].

The base station can randomly select a back-off counter N from a contention window (CW). In this case, the N is configured by an initial value Ninit [S1120]. The Ninit is randomly selected from among values ranging from 0 to $CW_p$.

Subsequently, if the back-off counter value (N) corresponds to 0 [S1122], the base station terminates the CAP and performs Tx burst transmission including PSCH [S1124]. On the contrary, if the back-off value is not 0, the base station reduces the back-off counter value by 1 [S1130].

The base station checks whether or not a channel of the LAA Scell(s) is in an idle state [S1140]. If the channel is in the idle state, the base station checks whether or not the back-off value corresponds to 0 [S1150]. The base station repeatedly checks whether or not the channel is in the idle state until the back-off value becomes 0 while reducing the back-off counter value by 1.

In the step S1140, if the channel is not in the idle state i.e., if the channel is in a busy state, the base station checks whether or not the channel is in the idle state during a defer duration (more than 15 usec) longer than a slot duration (e.g., 9 usec) [S1142]. If the channel is in the idle state during the defer duration, the base station can resume the CAP [S1144]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1142 again to check whether or not the channel is in the idle state during a new defer duration.

Referring back to FIG. 11, the base station checks whether or not the back-off counter value (N) becomes 0 [S1150]. If the back-off counter value (N) becomes 0, the base station terminates the CAP and may be able to transmit a Tx burst including PDSCH.

The base station can receive HARQ-ACK information from a UE in response to the Tx burst [S1170]. The base station can adjust a CWS (contention window size) based on the HARQ-ACK information received from the UE [S1180].

In the step S1180, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1160, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

3. Proposed Embodiment

When a base station or a UE performs LBT (listen-before-talk)-based signal transmission in a wireless communication system consisting of the base station and the UE, the present invention proposes a detail downlink transmission method.

According to the present invention, a base station or a UE should perform LBT to transmit a signal on an unlicensed band. When the base station or the UE transmits a signal, it is necessary to make signal interference not to be occurred with different communication nodes such as Wi-Fi, and the like. For example, according to Wi-Fi standard, a CCA threshold value is regulated by −62 dBm and −82 dBm for a non-Wi-Fi signal and a Wi-Fi signal, respectively. In particular, if an STA (station) or an AP (access point) senses a signal received with power (or energy) equal to or greater than −62 dBm rather than Wi-Fi, the STA or the AP does not perform signal transmission.

In this case, it may be difficult to always guarantee DL transmission of an eNB or UL transmission of a UE on an unlicensed. Hence, a UE operating on the unlicensed band may maintain access with a different cell operating on a licensed band to stably control mobility, RRM (radio resource management) function, and the like. In the present invention, for clarity, a cell accessed by a UE on the unlicensed band is referred to as a U-Scell (or LAA Scell) and a cell accessed by the UE on the licensed band is referred to as a Pcell. As mentioned in the foregoing description, a scheme of performing data transmission/reception on the unlicensed band using a combination with the licensed band is generally called LAA (licensed assisted access).

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

As shown in Table 2, in Rel-13 LAA system, 4 channel access priority classes are defined in total. And, a length of a defer period, a CWS, MCOT (maximum channel occupancy time), and the like are defined according to each of the channel access priority classes. Hence, when an eNB transmits a downlink signal via an unlicensed band, the eNB performs random backoff by utilizing LBT parameters determined according to a channel access priority class and may be then able to access a channel during limited maximum transmission time only after the random backoff is completed.

For example, in case of the channel access priority class 1/2/3/4, the maximum channel occupancy time (MCOT) is determined by 2/3/8/8 ms. The maximum channel occupancy time (MCOT) is determined by 2/3/10/10 ms in environment where other RAT such as Wi-Fi does not exists (e.g., by level of regulation).

As shown in Table 2, a set of CWSs capable of being configured according to a class is defined. One of points different from Wi-Fi system is in that a different backoff counter value is not defined according to a channel access priority class and LBT is performed using a single backoff counter value (this is referred to as single engine LBT).

For example, when an eNB intends to access a channel via an LBT operation of class 3, since CWmin (=15) is configured as an initial CWS, the eNB performs random backoff by randomly selecting an integer from among numbers ranging from 0 to 15. If a backoff counter value becomes 0, the eNB starts DL Tx and randomly selects a new backoff counter for a next Tx burst after the DL Tx burst is completed. In this case, if an event for increasing a CWS is triggered, the eNB increases a size of the CWS to 31 corresponding to a next size, randomly selects an integer from among numbers ranging from 0 to 31, and performs random backoff.

In this case, when a CWS of the class 3 is increased, CWSs of all classes are increased as well. In particular, if the CW of the class 3 becomes 31, a CWS of a class 1/2/4 becomes 7/15/31. If an event for decreasing a CWS is triggered, CWS values of all classes are initialized by CWmin irrespective of a CWS value of the triggering timing.

Figure 12:
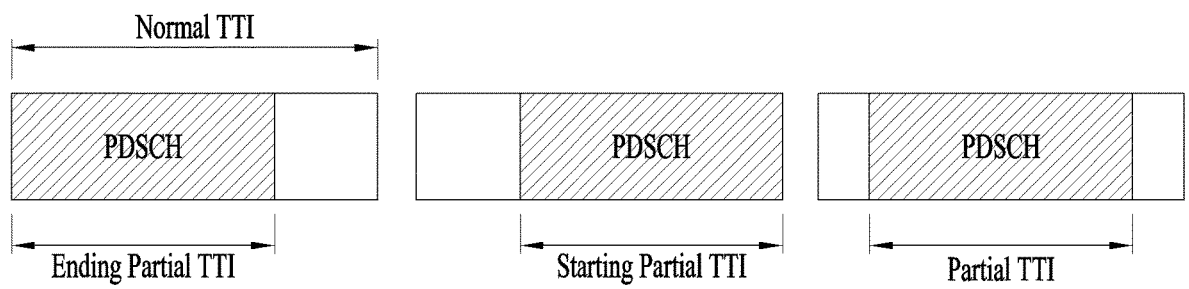
FIG. 12 is a diagram illustrating a partial TTI or a partial subframe applicable to the present invention.

FIG. 12 is a diagram illustrating a partial TTI or a partial subframe applicable to the present invention.

In Rel-13 LAA system, MCOT is utilized as much as possible when DL Tx burst is transmitted. In order to support consecutive transmission, a partial TTI, which is defined as DwPTS, is introduced. The partial TTI (or partial subframe) corresponds to a section in which a signal is transmitted as much as a length shorter than a legacy TTI (e.g., 1 ms) when PDSCH is transmitted.

In the present invention, for clarity, a starting partial TTI or a starting partial subframe corresponds to a form that a part of symbols positioned at the fore part of a subframe are emptied out. An ending partial TTI or an ending partial subframe corresponds to a form that a part of symbols positioned at the rear part of a subframe are emptied out. (On the contrary, an intact TTI is referred to as a normal TTI or a full TTI.)

FIG. 12 illustrates various types of the aforementioned partial TTI. The first drawing of FIG. 12 illustrates an ending partial TTI (or subframe) and the second drawing illustrates a starting partial TTI (or subframe). The third drawing of FIG. 12 illustrates a partial TTI (or subframe) that a part of symbols positioned at the fore part and the rear part of a subframe are emptied out. In this case, when signal transmission is excluded from a normal TTI, a time section during which the signal transmission is excluded is referred to as a transmission gap (TX gap).

Although the present invention is explained on the basis of a DL operation in FIG. 12, the present invention can also be identically applied to a UL operation. For example, a partial TTI structure shown in FIG. 12 can be applied to a form of transmitting PUCCH or PUSCH as well.

According to an unlicensed band regulation, when a specific node transmits a signal via an unlicensed band, there may exist a constraint such that the signal should occupy more than X % of a system bandwidth. For example, ETSI regulation regulates that more than 80% of a nominal bandwidth should be occupied. When a system has a system bandwidth of 20 MHz, it is able to satisfy the regulation only when transmission is performed by loading 99% of power to 16 MHz band at least.

And, there may exist a constraint on an unlicensed band in the aspect of power spectral density (PSD) as well. For example, according to the ETSI regulation, there may exist a constraint such that a signal should be transmitted while PSD of 10 dBm/1 MHz is satisfied on a partial band. In this case, in order for a specific UE to minimize a TXP (transmission power) constraint according to the PSD constraint while transmitting PUSCH, it may apply a method of performing PUSCH transmission with a multi-cluster structure or a B-IFDMA (block-interleaved FDMA) structure.

Figure 13:
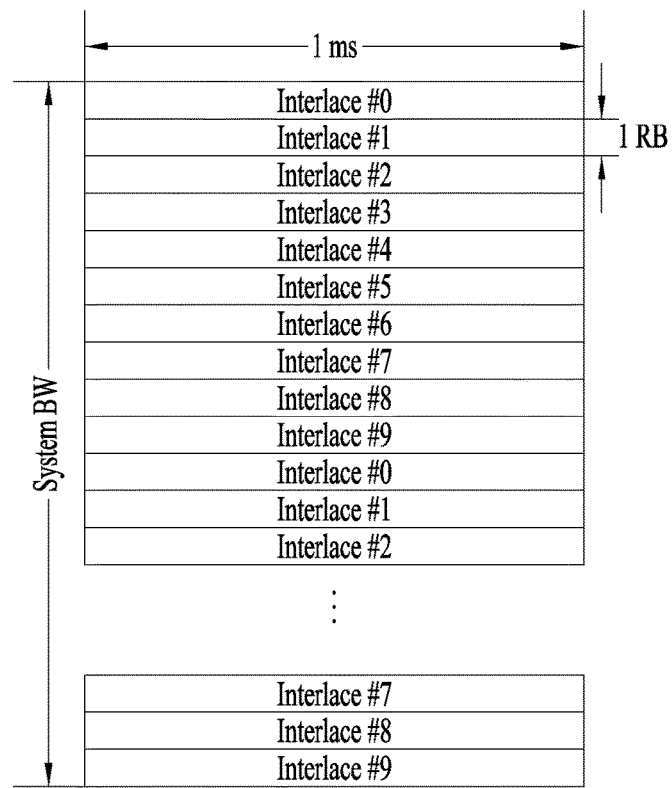
FIG. 13 is a diagram illustrating a B-IFDMA (block-interleaved FDMA) structure.

FIG. 13 is a diagram illustrating a B-IFDMA (block-interleaved FDMA) structure.

For example, as shown in FIG. 13, a B-IFDMA structure applicable to the present invention can be represented by 10 interlaces of which a cluster size corresponds to 1 RB and a space between clusters corresponds to 10 RBs among 100 RBs in a system bandwidth of 20 MHz. In this case, PUSCH can be transmitted via one or more interlaces.

Hence, it is necessary to define a resource allocation (hereinafter, RA) method capable of transmitting PUSCH on an unlicensed band and satisfying the aforementioned bandwidth and the PSD regulation (or restriction). The present invention proposes an RA method for transmitting PUSCH in consideration of a bandwidth within an unlicensed band and a regulation on PSD. In the present invention, interlace is utilized as an expression indicating a resource structure that a cluster (or block) consisting of consecutive subcarriers is repeated with a prescribed interval on a frequency axis.

3.1. Method 1

A base station can configure a plurality of resource segmentation schemes to segment the entire resource region capable of performing PUSCH transmission into the N number of resource units. The base station can promise configuration information (including a form of each of the resource units and a resource index) with a UE in advance or may inform the UE of the configuration information via higher layer signaling.

Specifically, a plurality of the resource segmentation schemes can include a method of segmenting the entire resource region into the N number of RBGs (resource block groups) and a method of segmenting the entire resource region into the N number of interlaces.

When resource segmentation schemes have the same (physical) form of distinguishing resource units from each other, if the resource segmentation schemes have a different resource index for a resource unit having the same (physical) position, the resource segmentation schemes can be regarded as resource segmentation schemes different from each other.

More specifically, in LTE system according to an embodiment of the present invention, a base station can segment 100 RBs capable of performing PUSCH transmission on 20 MHz band into 10 (e.g., N=10) resource units. In this case, an RBG unit or an interlace unit can be applied to a resource unit. For example, when the entire resource region is divided into 10 RBGs, each of the RBGs includes 10 RBs and an RBG index can be assigned or indexed from a low frequency in an order of a frequency resource.

Figure 14:
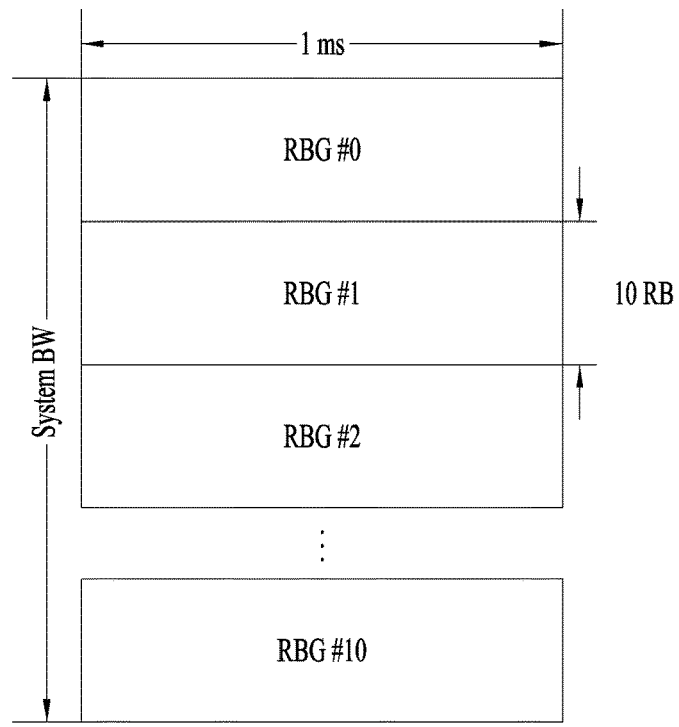
FIG. 14 is a diagram illustrating a resource allocation method according to a method 1 of the present invention.

FIG. 14 is a diagram illustrating a resource allocation method according to a method 1 of the present invention.

As shown in FIG. 14, the entire system bandwidth includes 10 RBGs in total and each of the RBGs can be configured by 10 RBs.

On the contrary, if the entire resource region is divided into interlaces, as shown in FIG. 13, segmented resources can be represented by 10 interlaces of which a cluster size corresponds to 1 RB and an interval between clusters corresponds to 10 RBs.

A base station and a UE can promise the RBG-based resource segmentation scheme and the interlace-based resource segmentation scheme in advance. Or, the base station can inform the UE of configuration information on the resource segmentation schemes via higher layer signaling. In this case, the configuration information on the resource segmentation schemes can include a physical resource form according to resource unit and a resource index according to a resource unit for the N number of resource units.

In this case, although resource segmentation schemes have the same (physical) form of distinguishing resource units from each other, if the resource segmentation schemes have a different resource index for a resource unit having the same (physical) position, the resource segmentation schemes can be regarded as resource segmentation schemes different from each other.

Figure 15:
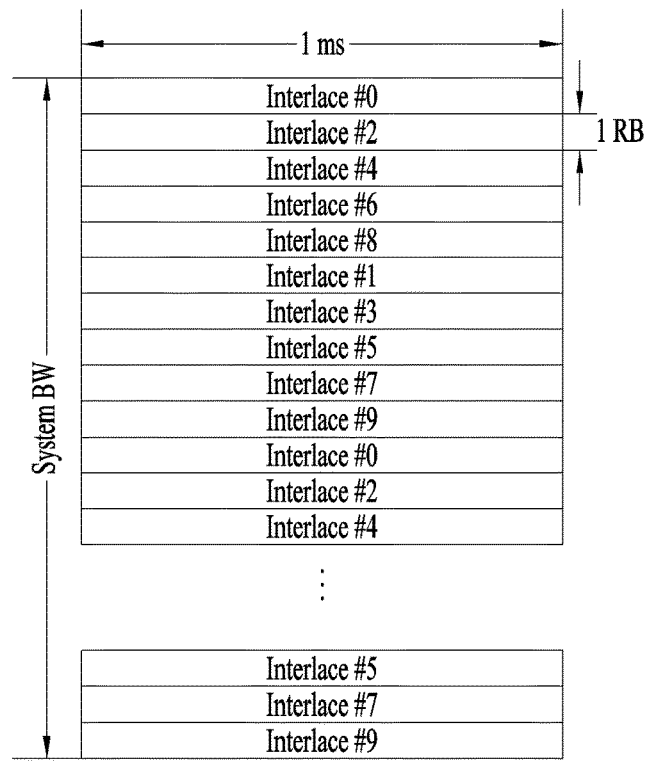
FIG. 15 is a diagram illustrating a different resource allocation method according to a method 1 of the present invention.

FIG. 15 is a diagram illustrating a different resource allocation method according to a method 1 of the present invention.

For example, although FIG. 15 illustrates an interlace structure identical to the interlace structure shown in FIG. 13, unlike FIG. 13, FIG. 15 illustrates an interlace structure to which different interlace index values are allocated. In this case, a resource segmentation scheme shown in FIG. 15 can be regarded as a resource segmentation scheme different from a resource segmentation scheme of FIG. 13.

In order to support the resource segmentation scheme shown in FIG. 15, a base station allocates a fixed physical resource index to each resource unit in a specific resource segmentation scheme and can inform a UE of additional information on a corresponding relationship between the physical resource index and a logical resource index. In this case, the UE may recognize the logical resource index as a final resource index. For example, as shown in FIG. 13, if the base station defines physical resource indexes for the interlaces, the UE may be able to map logical resource indexes to physical resource indexes in a form of a lookup table shown in Table 3 in the following.

TABLE 3

| Logical resource index | Physical resource index |
| --- | --- |
| 0 | 0 |
| 1 | 5 |
| 2 | 1 |
| 3 | 6 |
| 4 | 2 |
| 5 | 7 |
| 6 | 3 |
| 7 | 8 |
| 8 | 4 |
| 9 | 9 |

In this case, if the interlace structure shown in FIG. 13 is redefined in the aspect of the logical resource indexes according to the example of Table 3, the redefined interlace structure can be configured by the interlace structure shown in FIG. 15.

3.2. Method 2

When a base station configures a plurality of resource segmentation schemes to divide the entire resource region capable of performing PUSCH transmission into the N number of resource units, the base station can differently (or in proportion to a bandwidth) configure a value of the N according to a bandwidth of the entire frequency resource region (or a range of a bandwidth value).

In LTE system to which the present invention is applicable, a bit width of a bit field for RA within a UL grant is designed to be reduced in accordance with the decrease of a system bandwidth capable of performing PUSCH transmission. When granularity of resource allocation for RA is to be maintained with the same level irrespective of a system bandwidth, if a system bandwidth is relatively narrow, since the number of cases is reduced, the abovementioned design scheme may correspond to a natural design scheme.

In this viewpoint, when the entire resource region capable of performing PUSCH transmission is divided into the N number of resource units, a resource amount (e.g., number of RBs) allocated to each resource unit is designed to be fixed irrespective of a system bandwidth and a value of the N can be designed to have a smaller value in accordance with the decrease of the system bandwidth. More specifically, when a resource region is divided in a unit of RBG (or in a unit of interlace), the number of RBGs (or the number of interlaces) can be configured to be reduced in accordance with the decrease of a system bandwidth.

Figure 16:
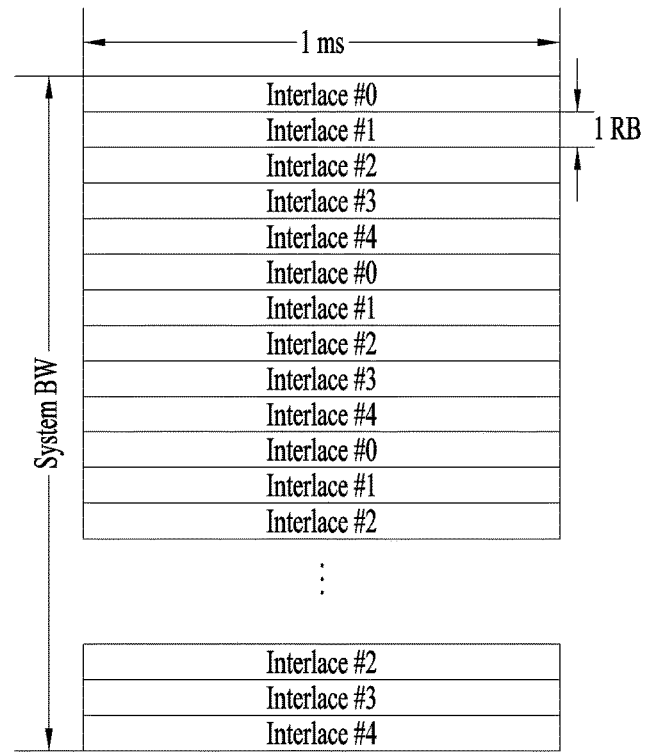
FIG. 16 is a diagram illustrating a resource allocation method according to a method 2 of the present invention.

FIG. 16 is a diagram illustrating a resource allocation method according to a method 2 of the present invention.

For example, when a system bandwidth corresponds to 10 MHz and a UE is able to transmit a PUSCH resource within 50 RBs, a base station can segment the entire resource region into 5 RBGs each of which has 10 RBs. Or, as shown in FIG. 16, the base station can segment the entire resource region into 5 interlaces each of which has 10 RBs.

In the following, resource segmentation schemes according to a system bandwidth are explained in more detail.

3.2.1. Example 1

If the entire system bandwidth is configured by the M number of RBs, a resource unit, the number of RBGs, or the number of interlaces can be configured by N=floor (M/K). In this case, K denotes RA granularity (or the minimum number of allocated RBs). For example, the K may correspond to 10 RBs.

For example, when the entire system band is configured by 55 RBs and RA granularity corresponds to 10 RBs, N=floor(55/10)=5 number of RBGs or interlaces can be defined for the entire system band. In this case, a resource corresponding to the M−N*K number of RBs can be added to a specific resource unit or a partial resource unit among the N number of resource units. For example, when the entire system band is configured by 55 RBs, if the entire system band is divided into 5 RBGs each of which has 10 RBs, the remaining 5 RBs can be included in the last RBG (or a specific RBG). Or, as shown in FIG. 16, if the entire system band is divided into 5 interlaces, the remaining 5 RBs can be respectively added to each of the 5 interlaces as much as 1 RB.

In this case, the operation of adding an RB can be sequentially performed in an ascending order (or a descending order) in the aspect of an interlace index. A partial data in interlace configured by the K number of RBs can be repeatedly transmitted in the added RB. For example, it may apply a circular repetition method as the abovementioned repetition method.

Or, it may apply a method of changing RA granularity by generating a symbol which is coded on the basis of K+M RB (in this case, M corresponds to an added RB).

3.2.2 Example 2

If the entire system band is configured by the M number of RBs, a resource unit, the number of RBGs, or the number of interlaces can be configured by N=ceil (M/K). In this case, K corresponds to RA granularity (or the minimum number of allocated RBs). For example, the K may correspond to 10 RBs.

For example, when the entire system band is configured by 55 RBs and RA granularity corresponds to 10 RBs, N=ceil(55/10)=6 number of RBGs or interlaces can be defined for the entire system band. In this case, a resource corresponding to the N*K−M number of RBs can be excluded from a specific resource unit or a partial resource unit among the N number of resource units. For example, when the entire system band is configured by 55 RBs, if the entire system band is divided into 6 RBGs each of which has 10 RBs, the deficient 5 RBs can be excluded from the last RBG (or a specific RBG). Or, if the entire system band is divided into 6 interlaces, the deficient 5 RBs can be respectively excluded from each of the 6 interlaces as much as 1 RB.

In this case, the operation of excluding an RB can be sequentially performed in a descending order (or an ascending order) in the aspect of an interlace index.

In the examples 1 and 2, a UE can select a TB size corresponding to the number of finally allocated RBs by reflecting the number of changed RBs according to an interlace.

3.2.3. Example 3

If the entire system band is configured by the M number of RBs, a base station selects the greatest integer M1 from among integers corresponding to a multiple of K and the integers equal to or less than the M and can perform PUSCH RA within a region configured by the M1 number of RBs only. In this case, K corresponds to RA granularity (or the minimum number of allocated RBs). For example, the K may correspond to 10 RBs. In this case, a resource unit, the number of RBGs, or the number of interlaces can be configured by N=(M1/K).

If a base station indicates PUSCH transmission to be performed in a region corresponding to the $N_1$ number of RBs, the base station selects the greatest integer $N_2$ from among integers corresponding to a common multiple of 2, 3, and 5 and the integers equal to or less than the $N_1$ and can exclude the $N_1-N_2$ number of RBs from allocated PUSCH resource. In this case, specifically, an operation of excluding the $N_1-N_2$ number of RBs can be performed in a descending order (or an ascending order) in the aspect of a resource index (e.g., RBG index, interlace index) for a resource unit. In the same resource unit, the operation of excluding the $N_1-N_2$ number of RBs can be performed in a descending order (or an ascending order) in the aspect of a frequency axis resource index. Or, the operation of excluding the $N_1-N_2$ number of RBs can be performed in a descending order (or an ascending order) in the aspect of a frequency axis resource index only.

3.3. Method 3

When a base station configures a plurality of resource segmentation schemes to divide the entire resource region capable of performing PUSCH transmission into the N number of resource units, the base station can inform a UE of a resource segment scheme selected from among a plurality of the resource segmentation schemes using a UL grant bit field.

In this case, information indicating the resource segment scheme selected from among a plurality of the resource segment schemes can be jointly coded with different information (within a UL grant).

For example, in LTE system according to an embodiment of the present invention, a base station can divide 100 RBs capable of performing PUSCH transmission on 20 MHz band into 10 (e.g., N=10) resource units. The base station can inform a UE of information indicating whether the entire resource region is divided into RBGs or interlaces using 1-bit information within a UL grant. Or, the base statin can inform the UE of following cases using 2-bit information. In particular, as shown in FIG. 14, '00' indicates a case that 100 RBs are divided into 10 RBGs. As shown in FIG. 13, '01' indicates a case that 100 RBs are divided into 10 interlaces and interlace indexes are continuously allocated. As shown in FIG. 15, '10' indicates a case that 100 RBs are divided into 10 interlaces and interlace indexes are discontinuously allocated. In this case, the 1-bit information or the 2-bit information can be transmitted via a specific bit field included in a legacy UL grant or a newly included bit field.

3.4. Method 4

When a base station configures a plurality of resource segmentation schemes to divide the entire resource region capable of performing PUSCH transmission into the N number of resource units, if the base station selects one from among a plurality of the resource segmentation schemes and informs a UE of the selected resource segmentation scheme, the UE can comprehend an RIV (resource indication value) within a UL grant as follows.

(1) The UE may comprehend the RIV as the RIV indicates the L number of consecutive indexes among the total N number of sequential indexes.

(2) Subsequently, the UE can configure a transmission resource using the L number of resource units having the L number of indexes (within the selected resource segmentation scheme).

In this case, the base station can inform the UE of the selected resource segmentation scheme using a UL grant.

For example, in LTE system according to an embodiment of the present invention, a base station can divide 100 RBs capable of performing PUSCH transmission on 20 MHz band into 10 (e.g., N=10) RBGs or interlaces. In this case, the base station can inform a UE of information indicating whether the entire resource region is divided into 10 RBGs or 10 interlaces using 1-bit information within a UL grant according to the aforementioned method 3.

In this case, the base station informs the UE of an RIV via a 6-bit bit field within the UL grant and the RIV can indicate the L number of consecutive indexes among 10 sequential indexes in total (e.g., 0, 1, 2, . . . , 8, 9) (e.g., indicates a start point and an end point among 11 points).

Figure 17:
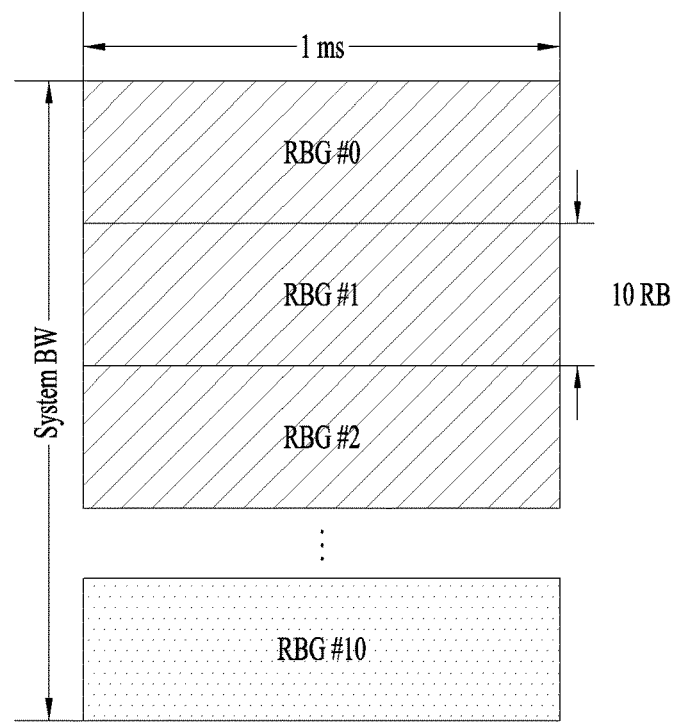
FIGS. 17 and 18 are diagrams illustrating a resource allocation method according to a method 4 of the present invention.
Figure 18:
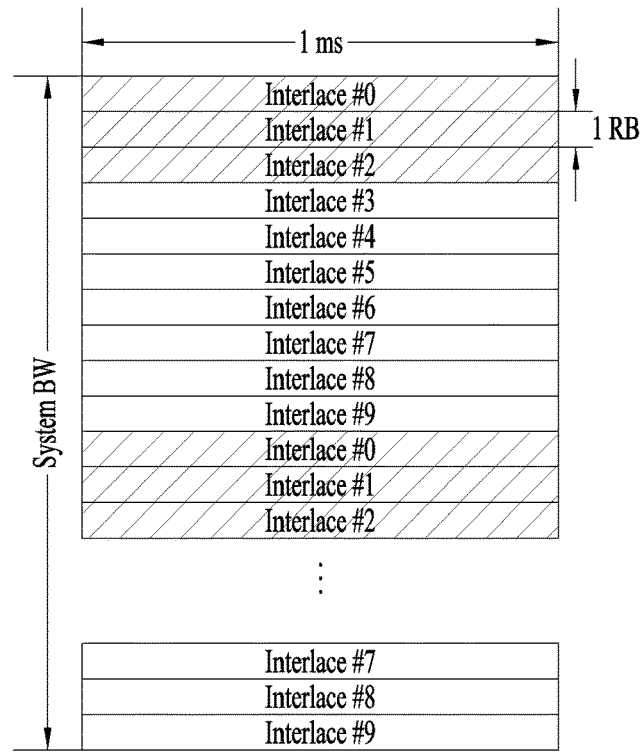

FIGS. 17 and 18 are diagrams illustrating a resource allocation method according to a method 4 of the present invention.

For example, assume that an MV indicates 3 indexes (e.g., 0, 1, 2). Then, as shown in FIG. 17, a base station can allocate RBG resources having the RBG indexes={0, 1, 2} based on the MV to perform PUSCH transmission. Or, as shown in FIG. 18, the base station can allocate interlace resources having interlace indexes={0, 1, 2} to perform PUSCH transmission.

Although a case of dividing a resource region into RBG units or interlace units has been illustrated to explain the aforementioned proposed method, the proposed method can also be extensively applied to a case that the entire resource region for performing data transmission is divided into the N number of resource units and a resource index is assigned to each resource unit. In particular, when there are a plurality of random resource segmentation methods for dividing the entire resource region for performing data transmission into the N number of resource units, the present invention can be extensively applied to a case that a selected resource segmentation method is indicated and indexes indicated by an MV indicate indexes of the resource units (according to a specific corresponding scheme) within the selected resource segmentation method.

If a base station assigns a fixed physical resource index to each of resource units within a specific resource segmentation scheme, informs a UE of additional information on a corresponding relationship between the physical resource index and a logical resource index, and as mentioned earlier in the method 4, indicates the L number of consecutive indexes among the total N number of consecutive indexes via an RIV (resource indication value) within a UL grant, the L number of indexes may correspond to the L number of logical resource indexes. In particular, a data transmission resource can be configured by resource units having logical resource indexes indicated by the RIV.

3.4.1. First Variation

If a base station selects a specific resource segmentation scheme from among a plurality of resource segmentation schemes for dividing the entire resource region capable of performing PUSCH transmission into the N number of resource units and indicates the selected resource segmentation scheme, as mentioned earlier in the method 4, a UE can comprehend an RIV (resource indication value) within a UL grant as follows.

1) The MV indicates the L number of consecutive indexes among the total N number of sequential indexes.

2) A transmission resource is configured by the L number of resource units having the L number of indexes (within the selected resource segmentation scheme).

Or, if the base station indicates the additional M (M is a factor of N) number of segmentations within the N number of resource units via a higher layer signal or a dynamic control signal (e.g., DCI), the UE can comprehend it as follows.

(1) The UE can interpret it as an MV indicates an offset value ($I_0$) and the number (L) of indexes to be selected for the total N number of sequential indexes.

(2) Subsequently, the UE can select the maximum P (E {1, 2, 3, . . . }) where $M*P \leq L$.

(3) Subsequently, the UE can define the M number of index groups ($G_0, G_1, \ldots, G_{M-1}$) as follows.

$$G_m = \{m*N/M, m*N/M+1, \ldots m*N/M+P-1\} \text{ for } m=0, 1, \ldots, M-1$$

(4) In this case, if $L=M*P+K$ ($K \in \{1, 2, 3, M-1\}$) is satisfied (or, L mod M is not 0), the UE can define the index group by changing the index group as follows.

$$G_k = \{k*N/M, k*N/M+1, \ldots k*N/M+P-1, k*N/M+P\} \text{ for } k=0,1,\ldots,K-1$$

(5) Subsequently, the UE can apply the $I_0$ to the previously defined M number of index groups as follows.

$$G_k = \{I_0+k*N/M, I_0+k*N/M+1, \ldots I_0+k*N/M+P-1, I_0+k*N/M+P\} \text{ for } k=0,1,\ldots,K-1$$

$$G_m = \{I_0+m*N/M, I_0+2*N/M+1, \ldots I_0+m*N/M+P-1\} \text{ for } m=K,1,\ldots,M-1$$

(6) The UE can configure a PUSCH transmission resource by the L number of resource units having the L number of indexes belonging to the M number of index groups determined via the aforementioned steps (1) to (5).

More specifically, in LTE system according to an embodiment of the present invention, a base station can divide 100 RBs capable of performing PUSCH transmission on 20

MHz band into 10 (e.g., N=10) interlaces. In this case, the base station can inform a UE of an RIV via a 6-bit bit field within a UL grant. The base station can indicate an offset value ($I_0$) and the number (L) of indexes to be selected from among the total 10 sequential indexes (e.g., 0, 1, 2, . . . , 8, 9) via the RIV.

Figure 19:
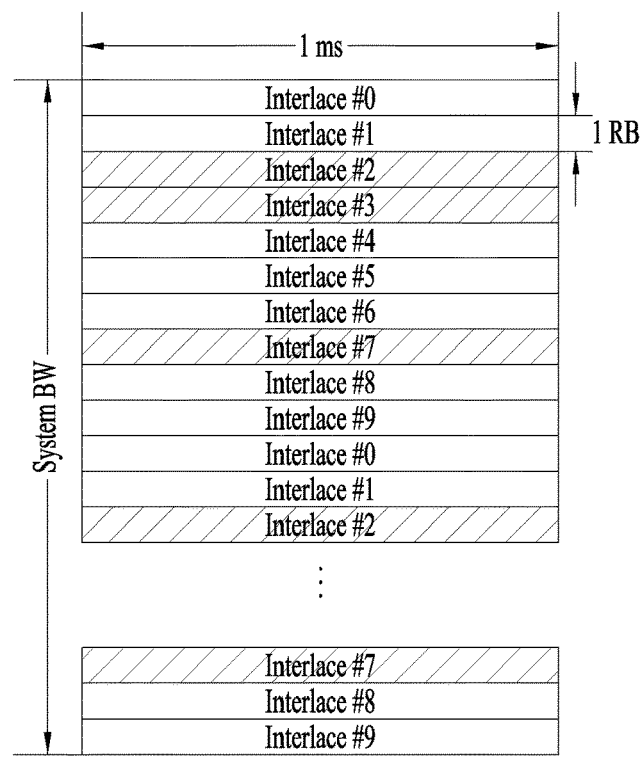
FIG. 19 is a diagram illustrating a resource allocation method according to the first variation of a method 4 of the present invention.

FIG. 19 is a diagram illustrating a resource allocation method according to the first variation of a method 4 of the present invention.

For example, assume that a base station indicates 2 and 3 as an offset value and an L value, respectively, via an MV. And, assume that the base station indicates M=2 as an indication for an additional segmentation within the 10 indexes. In this case, according to the first variation of the method 4 of the present invention, a UE selects 1 as a P value and can form two index groups including $G_0=\{0\}$ and $G_1=\{5\}$. Subsequently, since L=M*P+1 is satisfied, the UE updates $G_0$ with $G_0=\{0, 1\}$. Then, if the UE applies an offset value 2 to all groups, it may be able to select interlace indexes such as $G_0=\{2, 3\}$, $G_1=\{7\}$. In other word, as shown in FIG. 19, a resource for performing PUSCH transmission can be allocated to the UE.

When PSD restriction exists on an unlicensed band, since the first variation of the method 4 of the present invention makes a frequency axis resource to be spread as much as possible, it is able to reduce transmit power restriction when a UE transmits PUSCH.

3.4.2. Second Variation.

If a base station selects a specific resource segmentation scheme from among a plurality of resource segmentation schemes for dividing the entire resource region capable of performing PUSCH transmission into the N number of resource units and indicates the selected resource segmentation scheme, a UE can comprehend an RIV (resource indication value) within a UL grant as follows.

(1) The RIV indicates the L number of consecutive indexes among the total N number of sequential indexes.

(2) Each index of the L number of indexes corresponds to a resource index for a resource unit according to a predefined scheme (or via higher layer signaling).

(3) A transmission resource is configured by the L number of resource units having resource indexes corresponding to the L number of indexes (within the selected resource segmentation scheme).

In this case, the base station can inform the UE of the specific resource segmentation scheme via a UL grant.

More specifically, in LTE system according to an embodiment of the present invention, assume that a base station divides 100 RBs capable of performing PUSCH transmission on 20 MHz band into 10 (e.g., N=10) interlaces. In this case, the base station informs the UE of an RIV via a 6-bit bit field within a UL grant and the RIV can indicate the L number of consecutive indexes among 10 sequential indexes in total (e.g., 0, 1, 2, . . . , 8, 9) (e.g., indicates a start point and an end point among 11 points).

For example, assume that the MV indicates 0, 1, and 2. In this case, as shown in Table 4, the base station can define one-to-one corresponding relationship between an index indicated by the RIV and a resource index (or interlace index) in advance. Or, the base station can configure the corresponding relationship via higher layer signaling.

TABLE 4

| | Index (indicated by RIV) | | | | | | | | | |
|---|---|---|---|---|---|---|---|---|---|---|
| | 0 | 1 | 2 | 3 | 4 | 5 | 6 | 7 | 8 | 9 |
| Resource Index | 0 | 5 | 1 | 6 | 2 | 7 | 3 | 8 | 4 | 9 |

Figure 20:
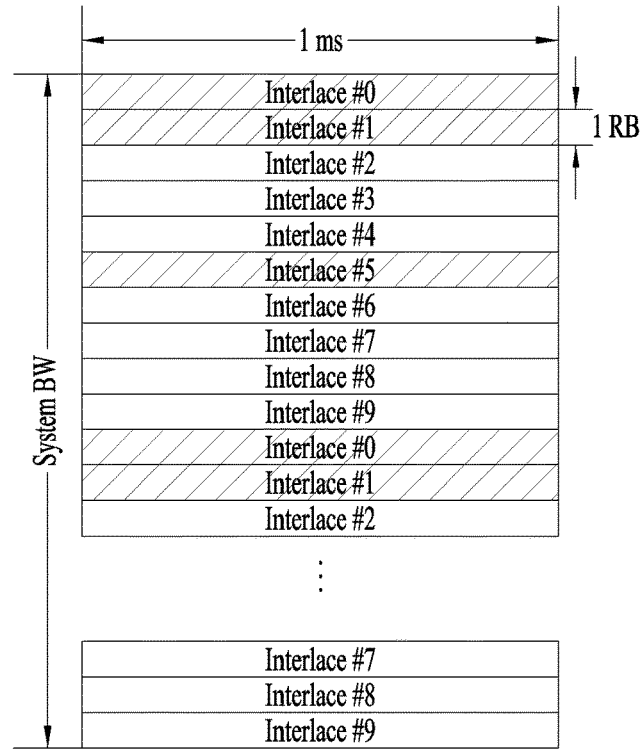
FIG. 20 is a diagram illustrating a resource allocation method according to the second variation of a method 4 of the present invention.

FIG. 20 is a diagram illustrating a resource allocation method according to the second variation of a method 4 of the present invention.

Referring to Table 4, indexes 0, 1, and 2 indicated by the RIV may correspond to interlace indexes 0, 5, and 1. As shown in FIG. 20, interlace resources having the interlace indexes 0, 5, and 1 can be allocated to perform PUSCH transmission.

3.4.3. Third variation

If a base station selects a specific resource segmentation scheme from among a plurality of resource segmentation schemes for dividing the entire resource region capable of performing PUSCH transmission into the N number of resource units and indicates the selected resource segmentation scheme, a UE can comprehend an MV (resource indication value) within a UL grant as follows.

(1) The RIV indicates the L number of consecutive indexes among the total P (>N) number of sequential indexes.

(2) Each index of the L number of indexes corresponds to a resource index for a resource unit according to a predefined scheme (or via higher layer signaling).

(3) A transmission resource is configured by the L number of resource units having resource indexes corresponding to the L number of indexes (within the selected resource segmentation scheme).

In this case, the base station can inform the UE of the specific resource segmentation scheme via a UL grant.

More specifically, in LTE system according to an embodiment of the present invention, assume that a base station divides 100 RBs capable of performing PUSCH transmission on 20 MHz band into 10 (e.g., N=10) interlaces. In this case, the base station informs the UE of an MV via a 6-bit bit field within a UL grant and the MV can indicate the L number of consecutive indexes among 11 sequential indexes in total (e.g., 0, 1, 2, . . . , 8, 9, 10) (e.g., indicates a start point and an end point among 12 points). In this case, as shown in Table 5, the base station can define one-to-one corresponding relationship between an index indicated by the MV and a resource index (or interlace index) in advance. Or, the base station can configure the corresponding relationship via higher layer signaling.

TABLE 5

| | Index (indicated by RIV) | | | | | | | | | | |
|---|---|---|---|---|---|---|---|---|---|---|---|
| | 0 | 1 | 2 | 3 | 4 | 5 | 6 | 7 | 8 | 9 | 10 |
| Resource Index | 0 | 5 | 1 | 6 | 2 | 7 | 3 | 8 | 4 | 9 | 0 |

Figure 21:
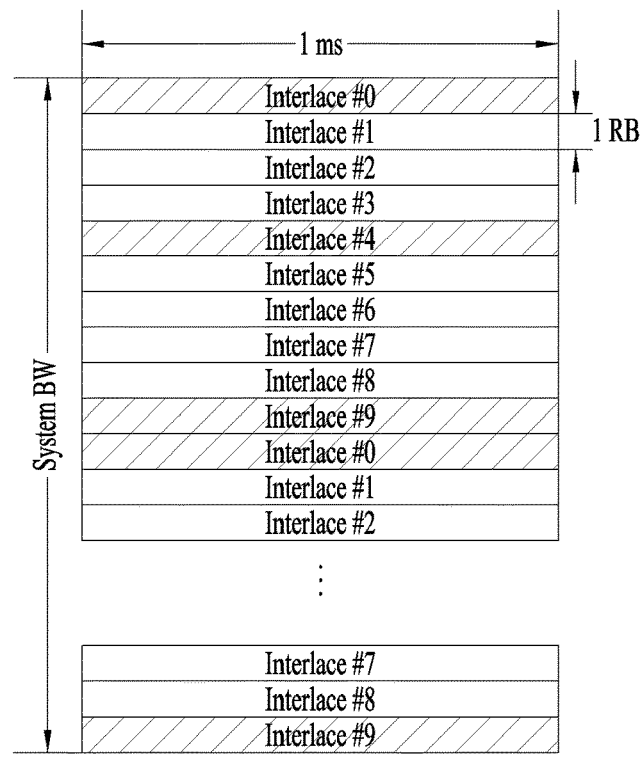
FIG. 21 is a diagram illustrating a resource allocation method according to the third variation of a method 4 of the present invention.

FIG. 21 is a diagram illustrating a resource allocation method according to the third variation of a method 4 of the present invention.

Referring to Table 5, if an RIV indicates indexes 8, 9, and 10, interlace indexes become 4, 9, and 0. As shown in FIG. 21, interlace resources having the interlace indexes 4, 9, and 0 can be allocated to perform PUSCH transmission.

In this case, a specific MV can be excluded from PUSCH RA. For example, when an MV indicates an index 10, since it is overlapped with a case that the MV indicates an index 0 to indicate an interlace index 0, the MV can be excluded from PUSCH RA. When the MV indicates indexes 0, 1, . . . , 10, since an interlace index 0 is overlapped, the RIV can be excluded from PUSCH RA.

In particular, while an RA field indicates an MV, the base station can omit a certain RIV. In particular, an RA field value is not interpreted as a direct MV. The RA field value can be interpreted as a corresponding RIV by a predefined table without being interpreted by a direct MV. In the example of FIG. 21, RIVs of $_{12}C_2=66$ may exist. 64 RIVs except two RIVs can be indicated by an RA field of 6 bits.

3.5. Method 5

If a base station selects a specific resource segmentation scheme from among a plurality of resource segmentation schemes for dividing the entire resource region capable of performing PUSCH transmission into the N number of resource units, indicates the selected resource segmentation scheme, and allocates the L number of resource units as a PUSCH transmission resource via an RIV within a UL grant, an order of allocating data may follow a resource order of a frequency axis (or time axis).

Figure 22:
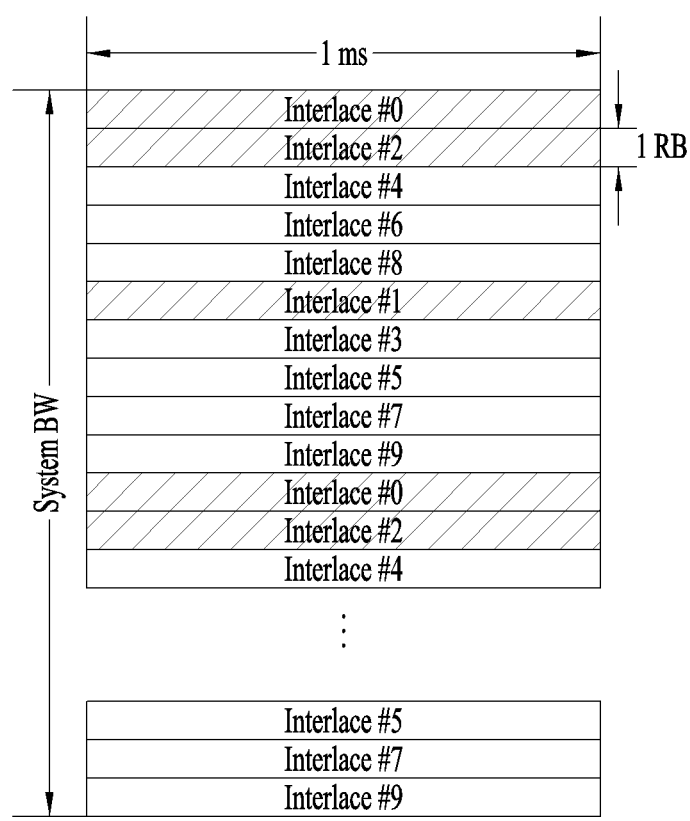
FIG. 22 is a diagram illustrating a resource allocation method according to a method 5 of the present invention.

FIG. 22 is a diagram illustrating a resource allocation method according to a method 5 of the present invention.

More specifically, assume that interlace indexes are configured as FIG. 18 and an MV indicates indexes 0, 1, and 2 according to the method 4. Then, interlace resources corresponding to the interlace indexes can be represented as FIG. 22.

In this case, although it is able to allocate data to be transmitted on PUSCH in an order of filling interlace #0, interlace #1, and interlace #2, since a DFT (discrete Fourier transform) spreading scheme is applied to the data to be transmitted on PUSCH by assuming continuous resource allocation, if possible, it is preferable to allocate the data according to a resource order of a frequency axis in terms of PAPR (peak power to average power ratio). Hence, it may consider a method of allocating data to lastly allocated resources according to a resource order of a frequency axis (or time axis).

3.6. Method 6

A base station can inform a UE of a resource region where RA within a UL grant is valid (or invalid) via an additional bit field within the UL grant for PUSCH.

In this case, the UE can exclude invalid resources among resource regions allocated by RA from PUSCH transmission resources according to an indication of the base station.

In this case, information on a resource region where the RA is valid (or invalid) can be jointly coded with different information (within a UL grant).

In Rel-14 LTE system according to an embodiment of the present invention, discussion on a method of supporting PRACH transmission in an LAA Scell is in progress. In this case, the PRACH transmission may not have a resource structure identical to a resource structure of PUSCH. For example, PUSCH transmission may have an interlace structure shown in FIG. 21 and the PRACH transmission can be performed in a form of a single cluster configured by consecutive subcarriers like LTE release-13 system.

In this case, it is necessary for the PUSCH transmission to avoid a PRACH transmission resource. In other word, a resource for transmitting the PUSCH should not be overlapped with a resource for transmitting the PRACH. In particular, when RA is indicated to a PUSCH transmission resource, the present invention proposes a method of (additionally) indicating a resource region where the RA is valid (or invalid).

More specifically, a base station can define an RA scheme to allocate the L number of consecutive interlaces among 10 interlaces to a UE as a PUSCH transmission resource in the interlace structure mentioned earlier in FIG. 13. In this case, unless there is an additional signal, the UE always transmits PUSCH on the entire system band.

In this case, according to the method 6 of the present invention, the base station can inform the UE of a resource region where the RA is valid (or invalid) by indicating the M number of consecutive RBGs among 10 RBGs in the RBG structure shown in FIG. 14.

Figure 23:
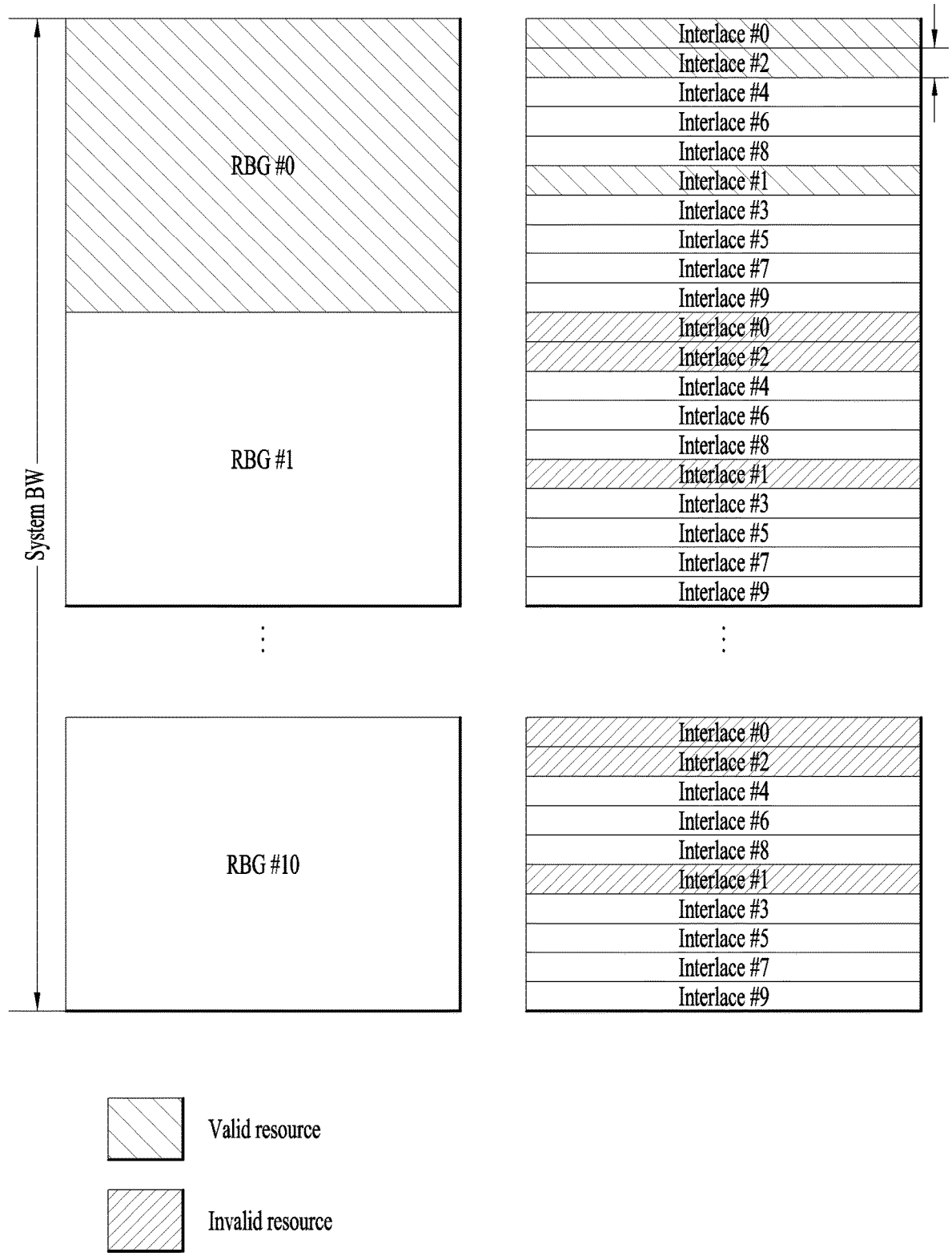
FIG. 23 is a diagram illustrating a resource allocation method according to a method 6 of the present invention.

FIG. 23 is a diagram illustrating a resource allocation method according to a method 6 of the present invention.

As shown in FIG. 22, if a base station allocates interlaces to a UE via RA and the base station additionally informs the UE that the RA is valid only in a region corresponding to an RBG index 0 in the RBG structure mentioned earlier in FIG. 20, the final PUSCH allocation resource can be represented as FIG. 23.

More specifically, a UL grant includes a bit field of 6 bits (($>\log_2(_{11}C_2)$) capable of indicating a resource region where RA is valid (or invalid) with granularity in a unit of 10 RBs for 100 RBs using the number of cases for selecting a start point and an end point from among 11 points. RA can be indicated by a bit field of 6 bits ($>\log_2(_{11}C_2)$) according to the number of cases for selecting a start point and an end point from among 11 points for consecutive interlaces among 10 interlaces.

In addition, if a size of a cluster applied to RA corresponds to 1 RB and an interval between frequency axis start points of a cluster corresponds to 5 RBs, the number of cases for allocating consecutive interlaces among 5 interlaces may correspond to the number of cases of selecting a start point and an end point from among 6 points and RA can be indicated via a bit field of 7 bits ($>\log_2(55+15)$).

And, it may be able to configure a base station to indicate a resource region where PUSCH RA is invalid in consideration of PRACH transmission and the like via the aforementioned method 6.

3.7. Method 7

When a base station divides the entire resource region capable of performing PUSCH transmission into the N number of resource units, the base station considers the entire system band from which a specific frequency region is excluded as the entire resource region and can configure the N number of resource units (RBGs or interlaces).

More specifically, the base station can reserve a specific resource region within the entire system band in consideration of transmission of PRACH, and the like. In this case, a PUSCH transmission resource may correspond to a region rather than the specific resource region in the entire system band. The base station can divide the region into the N number of resource units. For example, when 20 MHz system band consists of 100 RBs in total, the base station reserves 40 RBs out of 100 RBs to transmit PRACH and may be able to configure 6 interlaces each of which has 10 RBs for the remaining 60 RBs. In this case, the base station can inform a UE of information on whether or not a specific resource region for the PRACH is applied in a specific UL subframe via a dynamic control signal.

Figure 24:
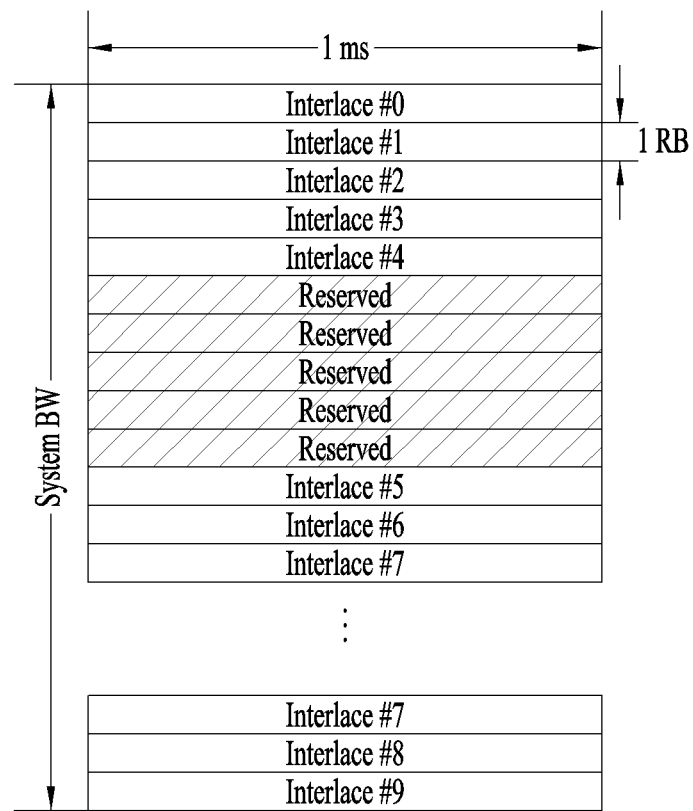
FIG. 24 is a diagram illustrating a resource allocation method according to a method 7 of the present invention.

FIG. 24 is a diagram illustrating a resource allocation method according to a method 7 of the present invention.

As shown in FIG. 24, a base station can exclude a partial band of the entire system band from a PUSCH transmission resource to transmit PRACH and the like. In this case, it is able to define interlaces for the remaining resources except the partial band and an index of interlace can be differently defined depending on whether the specific resource region is excluded or not.

3.8 Method 8

If a base station indicates RA with a bit field of B bits within a UL grant for PUSCH RA, a UE can interpret a value indicated by the RA field (or the bit field of B bits) as follows.

(1) The UE interprets a part of states indicated by the RA field (or B-bit field) as a corresponding RIV and may be then able to apply MV-based PUSCH RA. For example, the UE may apply the aforementioned method 4 or the first to the third variations of the method 4 as the RIV-based PUSCH RA.

(2) The UE interprets a part of states indicated by the RA field (or B-bit field) as a corresponding specific RA pattern and may be then able to apply the corresponding RA pattern.

More specifically, in LTE system according to an embodiment of the present invention, a base station can divide 100 RBs capable of performing PUSCH transmission on 200 MHz band into 10 (e.g., N=10) interlaces. In this case, if the aforementioned method 4, the first variation of the method 4, or the second variation of the method 4 is applied, since the number of necessary RIVs becomes 55 (0 to 54), the base station can configure a bit width of a PUSCH RA field by 6 bits to include all of the number of cases for the RIVs.

In this case, the RA field configured by 6 bits can express the number of cases as many as 64 in total. However, since the number of cases for the RIVs corresponds to 55, a part of states of the RA field can be wasted. Hence, the present invention proposes a method of utilizing the remaining states for indicating a specific RA pattern promised between a base station and a UE in advance.

If a PUSCH RA field according to the method 8 of the present invention indicates a specific RA pattern, the specific RA pattern can be applied as an RA pattern incapable of being expressed by an MV.

For example, in LTE system according to an embodiment of the present invention, a base station can divide 100 RBs capable of performing PUSCH transmission on 200 MHz band into 10 (e.g., N=10) interlaces. In this case, the MV can indicate the L number of consecutive indexes (or interlace indexes) among 10 sequential indexes in total (e.g., 0, 1, 2, . . . , 8, 9) (or interlace indexes) (e.g., indicates a start point and an end point among 11 points). In addition, if a specific state of a PUSCH RA field indicates a specific RA pattern, it is preferable for the specific RA pattern to indicate an index set (or an interlace index set) incapable of being expressed by the MV. In particular, a partial state (or remaining state) of the PUSCH RA field can be utilized for indicating resources corresponding to one of non-consecutive index sets (or interlace index sets).

In addition, if the entire system band 100 RBs are divided into 10 interlaces each of which has 10 RBs and indexes ranging from 0 to 9 are respectively assigned to the interlaces in a frequency order, it may be able to apply interlace pairs (0,5), (1,6), (2,7), (3,8), (4,9) with a resource allocation pattern rather than a resource allocation pattern indicated by an MV. In this case, when the 5 patterns are respectively referred to as patterns 0, 1, 2, 3, and 4, since each of the patterns corresponds to a pattern capable of maximizing frequency diversity for the entire system band and minimizing PSD, it is not important to determine a pattern to be allocated to a UE among the 5 patterns. However, it may be useful to allocate a resource allocation pattern to a different UE in an order of a pattern 0, 1, 2, 3, 4 in performing UE multiplexing in the same subframe. In this case, in order to sequentially allocate the patterns 0, 1, 2, 3, 4 to a plurality of UEs and allocate the remaining interlaces to other UEs, the present invention proposes to additionally define patterns described in the following.

Pattern A: interlace index (1, 2, 3, 4, 6, 7, 8, 9)
Pattern B: interlace index (2, 3, 4, 7, 8, 9)
Pattern C: interlace index (3, 4, 8, 9)

In general, the abovementioned method can be extensively applied as follows irrespective of the number of RBs of the entire system.

Define the N number of interlaces each of which has RBs separated from each other with an interval of N_interval in a system Define resource allocation for the N number of interlaces via RIV Support a resource allocation pattern (for clarity, this is referred to as an odd pattern) for interlace consisting of RBs of M interval (M<N)

Additionally support patterns configured by the remaining interlaces when a plurality of odd patterns are sequentially allocated on a frequency axis from a specific interlace (i.e., first interlace) in the same subframe If the number of RBs in a system is less, it may be difficult for the abovementioned resource allocation scheme to have a big gain in terms of the number of bits necessary for performing resource allocation. For example, when a resource is allocated by dividing a system of 100 RBs into 10 interlaces each of which has an interval of 10 RBs, it is necessary to have an MV of a size of 6 bits. In particular, it is able to save 4 bits compared to a bitmap scheme requiring 10 bits. On the other hand, when a resource is allocated by dividing a system of 50 RBs into 5 interlaces each of which has an interval of 10 RBs, it is necessary to have an MV of a size of 4 bits. In this case, degree of freedom of resource allocation is reduced compared to a bitmap scheme requiring 5 bits and the number of saved bits is insignificant.

In particular, if the number of RBs or interlaces is less in a system, the present invention proposes to perform resource allocation using a bitmap scheme. Otherwise, the present invention proposes to perform resource allocation using an MV scheme (and a scheme of supporting an additional pattern to the remaining code point). Specifically, the MV scheme can be applied to a system of 100 RBs or a system using 10 interlaces. On the other hand, the bitmap scheme can be applied to a system of 50 RBs or a system using 5 interlaces.

3.9. Method 9

When each of the M number of subbands is identically configured by the N number of RBs, a base station configures the N number of indexes {0, 1, . . . , N−1} for the RBs according to each subband and indicates all or a part of the indexes to a UE. In this case, if the base station configures RBs having specific indexes as a PUSCH transmission resource, the base station performs identical RB indexing on the first subband and the last subband (i.e., $M^{th}$ subband) among the M number of subbands and performs RB indexing on the remaining subbands as follows.

The base station can determine an index of a specific RB within a random $(k+1)^{th}$ subband by adding an offset value to an index of an RB of a relatively same physical position within a $k^{th}$ subband and then performing modulo arithmetic. In this case, the offset value can be determined by a function value based on a k value.

The base station can inform a UE of information of the offset value and the offset value may correspond to an element within a set including values equal to or greater than a specific value or a value proportional to k.

Specifically, if RB indexing identical to RB indexing within the $kt^h$ subband is not applied prior to the $k^{th}$ subband, the RB indexing identical to the RB indexing of the $k^{th}$ subband can be applied in a $(k+1)^{th}$ subband.

More specifically, when RBs are distributed on a system band with an equal interval in an interlace structure, if the interlace structure is applied, due to the non-linear characteristic of a power amplifier, IMD (inter modulation distortion) may occur.

When signals (e.g., f1, f2) are transmitted via frequency resources different from each other, if a distorted signal occurs at a frequency position (e.g., 2f1−f2, 2f2−f1) corresponding to a linear combination of frequencies corresponding to a harmonic frequency of each frequency, it is referred to as the 1 MB. If 1 MB signals are generated at a position far from an original signal, the IMD signals can be eliminated using a bad pass filter (BPF). However, since it is difficult to eliminate 3rd 1 MB signal, which is generated at the cubic clause of a non-linear output end, using the BPF, it may become a problem. The $3^{rd}$ 1 MB is given by $2f_1+f_2$, $f_1+2f_2$, $2f_1-f_2$, $2f_2-f_1$ for two frequencies (e.g., f1, f2) and the last two 1 MB signals may become a major consideration.

Figure 25:
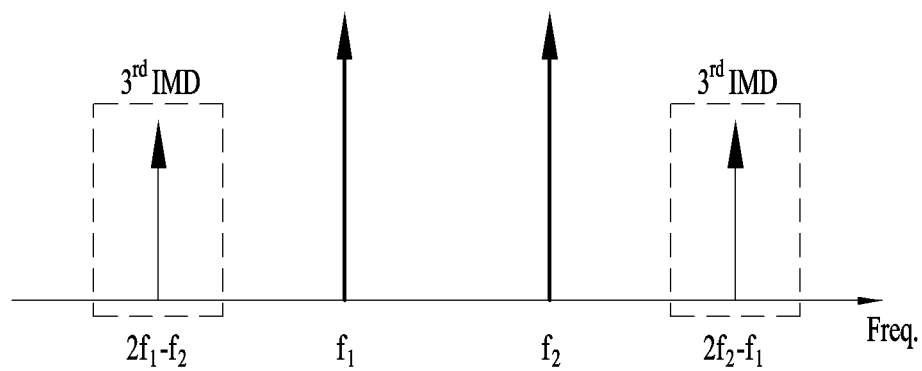
FIG. 25 is a diagram illustrating a form of an IMD signal generated for two frequency resources.

FIG. 25 is a diagram illustrating a form of an IMD signal generated for two frequency resources.

As shown in FIG. 25, an IMD signal can be generated at both sides of two frequency resources in a manner of being separated from the frequency resources as much as an interval between the frequency resources.

In particular, if a UE transmits PUSCH via RBs having an equal interval, the 1 MB signal can be applied to a PUSCH allocation resource to be transmitted by the UE as self-interference. In order to mitigate the problem above, the present invention propose a method of allocating PUSCH resources by distributing the PUSCH resource to the entire system band according to a regulation of an unlicensed band while $3^{rd}$ IMD clause is not applied as self-interference.

Figure 26:
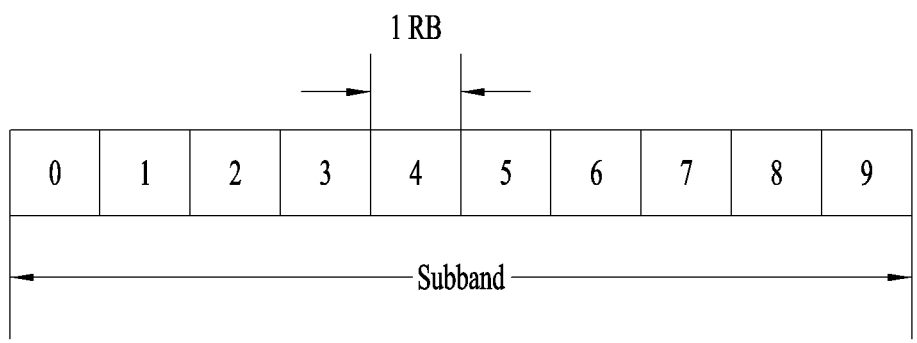
FIG. 26 is a diagram illustrating an RB indexing method applicable to the first and the last subbands according to a method 9 of the present invention.

FIG. 26 is a diagram illustrating an RB indexing method applicable to the first and the last subbands according to a method 9 of the present invention.

As shown in FIG. 26, if N=M=10 is satisfied, it is able to assign a sequential RB index to the first subband and the last subband ($10^{th}$ subband) according to an order of a physical resource. In this case, since an IMD signal is not generated on the second subband due to resource allocation in the first subband, RB indexing on the first subband can be identically applied to the second subband.

Figure 27:
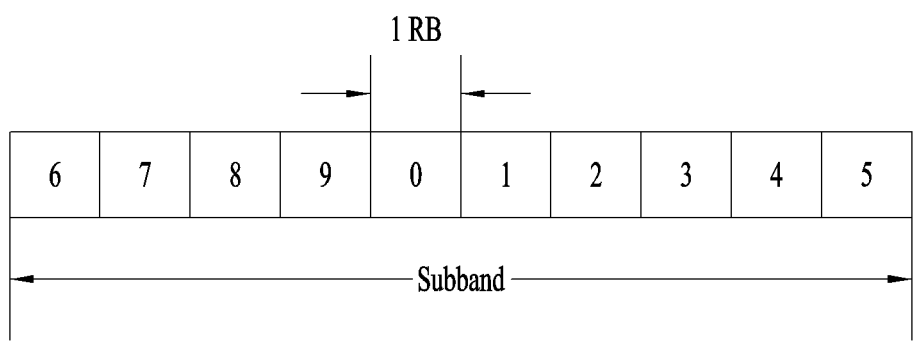
FIG. 27 is a diagram illustrating an RB indexing method applicable to the third and the fourth subbands according to a method 9 of the present invention.

FIG. 27 is a diagram illustrating an RB indexing method applicable to the third and the fourth subbands according to a method 9 of the present invention.

If RB indexing applied to the second subband is identically applied to the third subband, an IMD signal may cause interference due to frequency resources allocated to the first and the second subbands. Hence, it may be able to apply RB indexing different from RB indexing applied to the first and the second subbands to the third subband. In other word, in order to make RBs positioned at a relatively same position have a different RB index, it may be able to apply RB indexing of the third and the fourth subbands.

In this case, an interval between RBs indicated by the same index should have an interval equal to or greater than 1 MHz for the second subband and the third subband in consideration of the maximum PSD restriction per 1 MHz according to ETSI regulation. This means that it is necessary to have an offset value equal to or greater than 6. In other word, it means that it is necessary to select an offset value from among 6, 7, 8, and 9.

In this case, as shown in FIG. 27, RB indexes for the third subband and the fourth subband can be assigned by applying an offset value 6 for FIG. 26 and performing modulo arithmetic.

Figure 28:
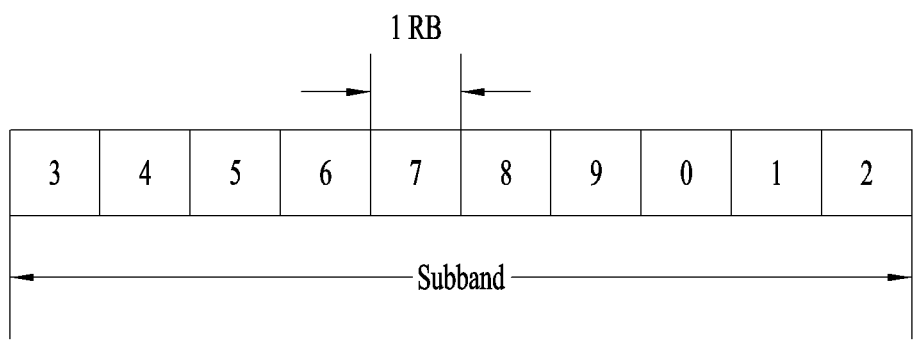
FIG. 28 is a diagram illustrating an RB indexing method applicable to the fifth and the sixth subbands according to a method 9 of the present invention.

FIG. 28 is a diagram illustrating an RB indexing method applicable to the fifth and the sixth subbands according to a method 9 of the present invention.

RB indexes for the fifth subband and the sixth subband can be assigned by adding an offset value to RB indexes of the third subband and the fourth subband and then performing modulo arithmetic. In this case, in order not to generate IMD, an offset value can be selected from among {6, 7, 8, 9}. For example, if 7 is applied as an offset value, RB indexes for the fifth subband and the sixth subband can be assigned as FIG. 28.

Figure 29:
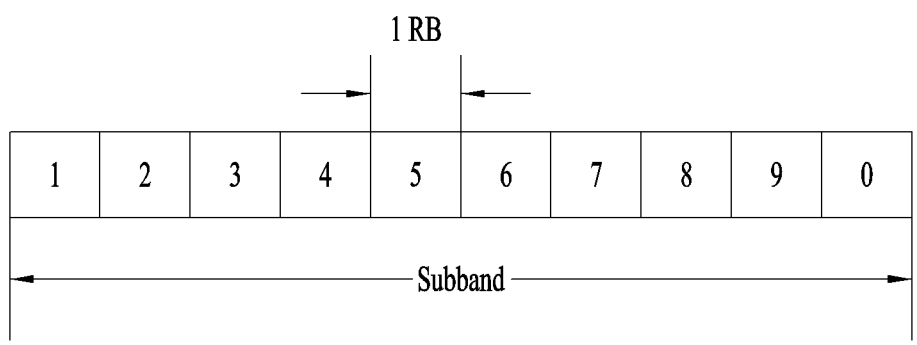
FIG. 29 is a diagram illustrating an RB indexing method applicable to the seventh and the eighth subbands according to a method 9 of the present invention.

FIG. 29 is a diagram illustrating an RB indexing method applicable to the seventh and the eighth subbands according to a method 9 of the present invention.

RB indexes for the seventh subband and the eighth subband can be assigned by adding an offset value to RB indexes of the fifth subband and the sixth subband and then performing modulo arithmetic. For example, if 8 is applied as an offset value, RB indexes for the seventh subband and the eighth subband can be assigned as FIG. 29.

Lastly, as shown in FIG. 26, an RB index applied to the tenth (or the last) subband can be identically applied to the ninth subband.

The aforementioned configuration is more generally explained in the following. When an offset applied between a $k^{th}$ subband and a $(k+1)^{th}$ subband corresponds to k (i.e., an offset relatively added to an RB index of the subband k compared to the subband (k+1)), a set S={Offset 1, Offset 2, . . . , Offset M−1} can be defined to satisfy conditions described in the following.

(1) Offset 1+Offset 2++Offset M−2+Offset M−1 corresponds to a multiple of N.

(2) The sum of the L number of consecutive offsets has a value different from a value of the sum of the L number of another consecutive offsets for a random L. (This condition is satisfied even when the L corresponds to 1. In particular, two consecutive offset values should have a different value.)

(3) If necessary, the offset value can be selected by an element belonging to a set equal to or greater than a specific value.

Additionally, a $k^{th}$ subband and a $(k+1)^{th}$ subband are defined as a group k and an offset applied between the group k and a group (k+1) (i.e., an offset relatively added to an RB index of the group k compared to the group (k+1)) is defined as a group offset k. In this case, if N=M=10 is satisfied, a set {Group Offset 1, Group Offset 2, Group Offset 3, Group Offset 4} may apply one of cases satisfying the (2) condition among order sets capable of being generated by duplicately using elements belonging to {6, 7, 8, 9}. (e.g., one selected from (6, 7, 8, 9), (6, 8, 7, 9), (6, 7, 9, 8), (6, 8, 9, 7), (7, 6, 8, 9), (7, 6, 9, 8), (7, 9, 6, 8), (7, 9, 8, 6), (8, 6, 7, 9), (8, 6, 9, 7), (8, 9, 6, 7), (8, 9, 7, 6), (9, 7, 6, 8), (9, 8, 6, 7), (9, 7, 8, 6), (9, 8, 7, 6) can be applied.)

As mentioned in the foregoing description, a base station can allocate an uplink resource for transmitting an uplink signal to a UE and the base station and the UE can transmit and receive an uplink signal using the allocated uplink resource.

The base station transmits control information for allocating an uplink resource to the UE and can receive an uplink signal from the UE via (or through) an uplink resource indicated by the control information.

The UE receives control information for allocating an uplink resource from the base station and can transmit an uplink signal to the base station via an uplink resource indicated by the control information.

In this case, the control information indicates a state among a plurality of states indicating one or more interlaces among a plurality of interlaces included in the entire system band. The plurality of the states can include first states indicating one or more consecutive (or contiguous) interlaces and second states indicating one or more non-consecutive (or non-contiguous) interlaces. For details, it may refer to the method 8 of the present invention.

In this case, one interlace can be configured by resource blocks (RBs) separated from each other with a prescribed frequency interval. The prescribed frequency interval may correspond to 10 RBs.

As mentioned earlier in the pattern A proposed in the method 8 of the present invention, if 10 interlaces included in the entire system band are indexed by interlaces 0 to 9 in an order of frequency domain, the second states can include a state indicating interlaces having indexes of (1, 2, 3, 4, 6, 7, 8, 9) among the 10 interlaces.

As mentioned earlier in the pattern A proposed in the method 8 of the present invention, if 10 interlaces included in the entire system band are indexed by interlaces 0 to 9 in an order of frequency domain, the second states can include a state indicating interlaces having indexes of (2, 3, 4, 7, 8, 9) among the 10 interlaces.

In this case, the control information can include an RIV (resource indication value).

And, the entire system band may correspond to 100 resource blocks (RBs).

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/aggregated form of a part of embodiments. It may define a rule that an eNB informs a UE of information on whether to apply the proposed methods (or, information on rules of the proposed methods) via a predefined signal (e.g., physical layer signal or higher layer signal).

4. Device Configuration

Figure 30:
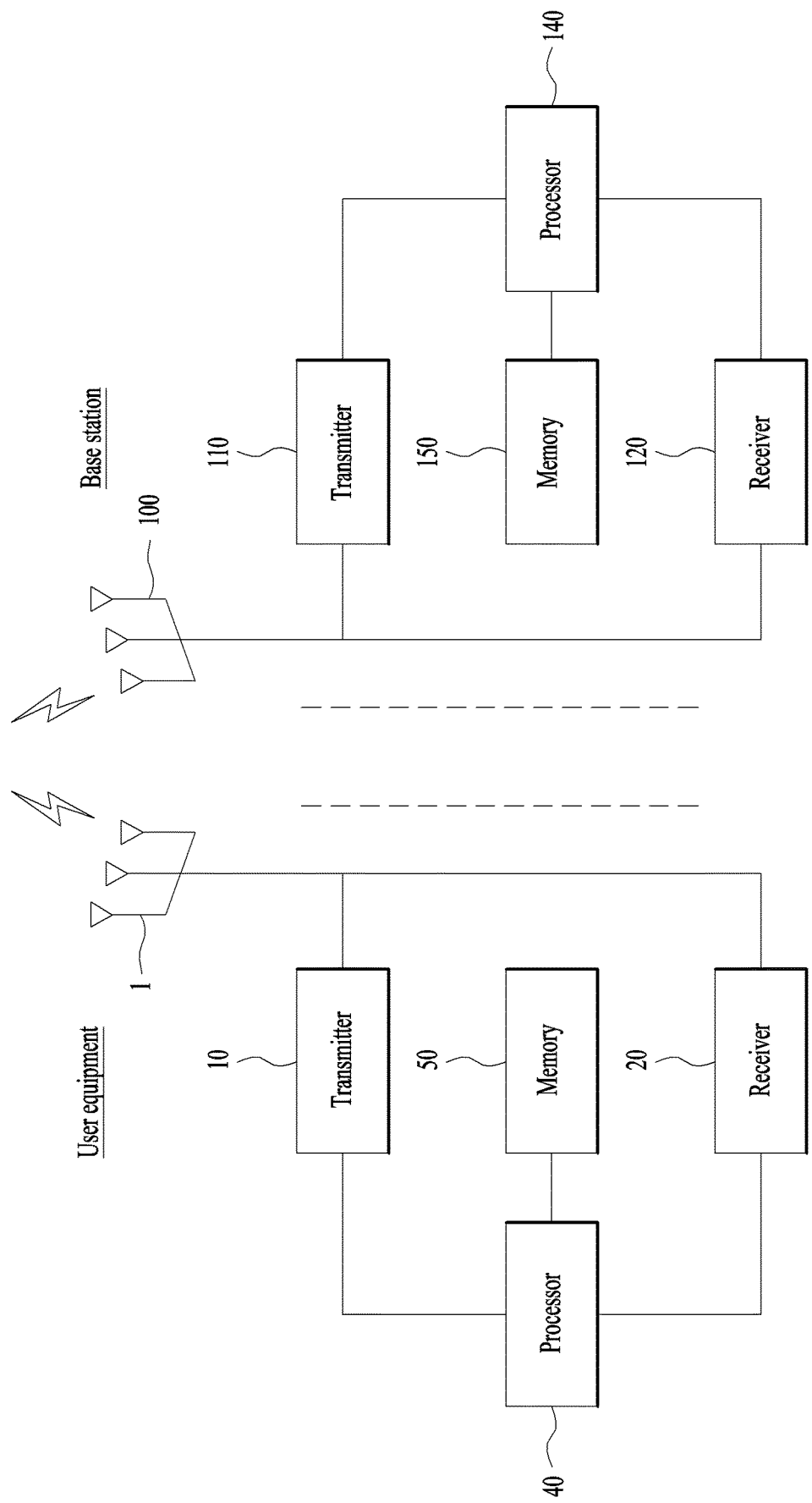
FIG. 30 is a diagram illustrating configurations of a UE and a base station in which proposed embodiments are implementable.

FIG. 30 is a diagram illustrating configurations of a UE and a base station capable of being implemented by the embodiments proposed in the present invention. The UE and the base station shown in FIG. 30 operate to implement the embodiments of a method of transmitting and receiving a signal between the UE and the base station.

A UE 1 may act as a transmission end on a UL and as a reception end on a DL. A base station (eNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The base station 100 transmits control information for allocating an uplink resource to the UE via the processor 140 and can receive an uplink signal from the UE via an uplink resource indicated by the control information. In this case, the control information indicates a state among a plurality of states indicating one or more interlaces among a plurality of interlaces included in the entire system band. The plurality of the states can include first states indicating one or more consecutive (or contiguous) interlaces and second states indicating one or more non-consecutive (or non-contiguous) interlaces.

The UE 1 receives control information for allocating an uplink resource from the base station via the processor 40 and can be configured to transmit an uplink signal via an uplink signal via an uplink resource indicated by the control information. In this case, the control information indicates a state among a plurality of states indicating one or more interlaces among a plurality of interlaces included in the entire system band. The plurality of the states can include first states indicating one or more consecutive (or contiguous) interlaces and second states indicating one or more non-consecutive (or non-contiguous) interlaces.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 30 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 180 or 190 and executed by the processor 120 or 130. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The embodiments of the present invention can be applied to various wireless access systems including 3GPP (3rd Generation Partnership Project) and 3GPP2 system. The embodiments of the present invention can be applied not only to various wireless access systems but also to all technical fields to which the various wireless access systems are applied. Further, the proposed method can also be applied to an mmWave communication system using ultra-high frequency band.

What is claimed is:

1. A method of receiving an uplink signal, which is received by a base station from a user equipment in a wireless communication system, the method comprising:
   transmitting control information for allocating an uplink resource to the user equipment; and
   receiving the uplink signal from the user equipment through the uplink resource based on the control information,
   wherein the control information informs allocated L interlaces for the uplink signal among N interlaces included in an entire system band, wherein each of the L and the N is a natural number,
   wherein, based on N=5 interlaces included in the entire system band: the allocated L interlaces are determined based on 5 bits of a bitmap included in the control information, and
   wherein, based on N=10 interlaces included in the entire system band:
      (i) the allocated L interlaces are determined based on 6 bits of a Resource Indication Value (RIV) included in the control information,
      (ii) based on the RIV being equal to one of 0 to 54: the allocated L interlaces have contiguous interlace indices, and the RIV corresponds to a starting interlace index and a number of the contiguous interlace indices, and
      (iii) based on the RIV being equal to or larger than 55: the allocated L interlaces have non-contiguous interlace indices, and the allocated L interlaces have indices equal to one of index sets (0, 5), (1, 6), (2, 7), (3, 8), (4, 9), (1, 2, 3, 4, 6, 7, 8, 9), and (2, 3, 4, 7, 8, 9).

2. The method of claim 1, wherein one interlace comprises resource blocks (RBs) separated from each other with a prescribed frequency interval.

3. The method of claim 2, wherein the prescribed frequency interval is 10 RBs.

4. The method of claim 3, wherein 10 interlaces included in the entire system band are indexed by interlaces 0 to 9 in a frequency domain order.

5. The method of claim 1, wherein the entire system band is 100 resource blocks (RBs).

6. A method of transmitting an uplink signal, which is transmitted by a user equipment to a base station in a wireless communication system, the method comprising:
   receiving control information for allocating an uplink resource from the base station; and
   transmitting the uplink signal through the uplink resource indicated by the control information,
   wherein the control information informs allocated L interlaces for the uplink signal among N interlaces included in an entire system band, wherein each of the L and the N is a natural number,
   wherein, based on N=5 interlaces included in the entire system band: the allocated L interlaces are determined based on 5 bits of a bitmap included in the control information, and
   wherein, based on N=10 interlaces included in the entire system band:
      (i) the allocated L interlaces are determined based on 6 bits of a Resource Indication Value (RIV) included in the control information,
      (ii) based on the RIV being equal to one of 0 to 54: the allocated L interlaces have contiguous interlace indices, and the RIV corresponds to a starting interlace index and a number of the contiguous interlace indices, and
      (iii) based on the RIV being equal to or larger than 55: the allocated L interlaces have non-contiguous interlace indices, and the allocated L interlaces have indices equal to one of index sets (0, 5), (1, 6), (2, 7), (3, 8), (4, 9), (1, 2, 3, 4, 6, 7, 8, 9), and (2, 3, 4, 7, 8, 9).

7. The method of claim 6, wherein one interlace comprises resource blocks (RBs) separated from each other with a prescribed frequency interval.

8. The method of claim 7, wherein the prescribed frequency interval is 10 RBs.

9. The method of claim 8, wherein 10 interlaces contained in the entire system band are indexed by interlaces 0 to 9 in a frequency domain order.

10. The method of claim 6, wherein the entire system band is 100 resource blocks (RBs).

11. A base station configured to receive an uplink signal from a user equipment in a wireless communication system, the base station comprising:
    a receiver;
    a transmitter; and
    a processor configured to operate in a manner of being connected with the receiver and the transmitter,
    wherein the processor is configured to:
    transmit control information for allocating an uplink resource to the user equipment; and
    receive the uplink signal from the user equipment through the uplink resource indicated by the control information,
    wherein the control information informs allocated L interlaces for the uplink signal among N interlaces included in an entire system band, wherein each of the L and the N is a natural number,
    wherein, based on N=5 interlaces included in the entire system band: the allocated L interlaces are determined based on 5 bits of a bitmap included in the control information, and
    wherein, based on N=10 interlaces included in the entire system band:
       (i) the allocated L interlaces are determined based on 6 bits of a Resource Indication Value (RIV) included in the control information, (ii) based on the RIV being equal to one of 0 to 54: the allocated L interlaces have contiguous interlace indices, and the RIV corresponds to a starting interlace index and a number of the contiguous interlace indices, and (iii) based on the RIV being equal to or larger than 55: the allocated L interlaces have non-contiguous interlace indices, and the allocated L interlaces have indices equal to one of index sets (0, 5), (1, 6), (2, 7), (3, 8), (4, 9), (1, 2, 3, 4, 6, 7, 8, 9), and (2, 3, 4, 7, 8, 9).

12. A user equipment configured to transmit an uplink signal to a base station in a wireless communication system, the user equipment comprising:

a receiver;

a transmitter; and a processor configured to operation in a manner of being connected with the receiver and the transmitter, wherein the processor is configured to:

receive control information for allocating an uplink resource from the base station; and transmit the uplink signal through the uplink resource indicated by the control information, wherein the control information informs allocated L interlaces for the uplink signal among N interlaces included in an entire system band, wherein each of the L and the N is a natural number, wherein, based on N=5 interlaces included in the entire system band: the allocated L interlaces are determined based on 5 bits of a bitmap included in the control information, and wherein, based on N=10 interlaces included in the entire system band:

(i) the allocated L interlaces are determined based on 6 bits of a Resource Indication Value (RIV) included in the control information, (ii) based on the RIV being equal to one of 0 to 54: the allocated L interlaces have contiguous interlace indices, and the RIV corresponds to a starting interlace index and a number of the contiguous interlace indices, and (iii) based on the RIV being equal to or larger than 55: the allocated L interlaces have non-contiguous interlace indices, and the allocated L interlaces have indices equal to one of index sets (0, 5), (1, 6), (2, 7), (3, 8), (4, 9), (1, 2, 3, 4, 6, 7, 8, 9), and (2, 3, 4, 7, 8, 9).

\* \* \* \* \*